(12) United States Patent
Ramezani et al.

(10) Patent No.: US 12,344,407 B2
(45) Date of Patent: Jul. 1, 2025

(54) MULTI-MODAL MOBILITY UNMANNED VEHICLE

(71) Applicant: California Institute of Technology, Pasadena, CA (US)

(72) Inventors: Alireza Ramezani, Boston, MA (US); Morteza Gharib, Altadena, CA (US); Reza Nemovi, Oceanside, CA (US); Eric Sihite, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 18/055,757

(22) Filed: Nov. 15, 2022

(65) Prior Publication Data

US 2023/0150660 A1 May 18, 2023

Related U.S. Application Data

(60) Provisional application No. 63/279,510, filed on Nov. 15, 2021.

(51) Int. Cl.
| | |
|---|---|
| *B64U 10/70* | (2023.01) |
| *B64C 37/00* | (2006.01) |
| *B64U 10/14* | (2023.01) |
| *B64U 60/60* | (2023.01) |
| *B64U 50/14* | (2023.01) |

(52) U.S. Cl.
CPC ............. *B64U 10/70* (2023.01); *B64C 37/00* (2013.01); *B64U 10/14* (2023.01); *B64U 60/60* (2023.01); *B64U 50/14* (2023.01)

(58) Field of Classification Search
CPC ....... B64C 37/00; B64C 39/024; B64C 25/36; B64C 7/00; B64U 50/14; B64U 10/14; B64U 10/70; B64U 30/26; B60F 5/02; B64D 35/04
See application file for complete search history.

(56) References Cited

U.S. PATENT DOCUMENTS

| | | | |
|---|---|---|---|
| 8,794,564 B2 * | 8/2014 | Hutson .................. | F16M 11/18 244/50 |
| 8,794,566 B2 * | 8/2014 | Hutson .................. | B64U 20/87 244/50 |
| 10,464,620 B2 * | 11/2019 | Arigoni .................. | G05D 1/027 |
| 11,338,634 B1 * | 5/2022 | Lacaze ....................... | B60F 5/02 |
| 11,673,663 B2 * | 6/2023 | Benedict ................ | B64D 27/24 244/17.23 |

(Continued)

*Primary Examiner* — Benjamin P Lee
(74) *Attorney, Agent, or Firm* — KPPB LLP

(57) ABSTRACT

In some embodiments, a multi-modal robot can be capable of aerial mobility and ground mobility, and can switch between configuration. The multi-modal robot can include a chassis, and a leg attached to the chassis. The leg can include a frontal hip joint. The frontal hip joint can rotate around a frontal hip axis of rotation. The frontal hip axis of rotation can be parallel to a longitudinal axis of the chassis. The leg can further include a sagittal hip joint, wherein the sagittal hip joint is coupled to the first distal end of a first link. The sagittal hip joint can rotate around a sagittal hip axis of rotation. The leg can include a wheel. The wheel can be configured to rotate around a wheel axis of rotation. The leg can further include a propeller. The propeller can be co-axial with the wheel.

17 Claims, 22 Drawing Sheets

(56) References Cited

U.S. PATENT DOCUMENTS

| | | | | |
|---|---|---|---|---|
| 11,760,477 | B2* | 9/2023 | Rallings | B64C 25/36 |
| | | | | 244/2 |
| 11,772,440 | B2* | 10/2023 | Salem | B64C 11/001 |
| | | | | 244/2 |
| 12,077,027 | B2* | 9/2024 | Opalinski | B60F 5/02 |
| 2008/0048065 | A1* | 2/2008 | Kuntz | B64C 27/20 |
| | | | | 244/17.23 |
| 2014/0061362 | A1* | 3/2014 | Olm | B60B 1/00 |
| | | | | 244/2 |
| 2017/0029103 | A1* | 2/2017 | Chang | B64U 30/299 |
| 2020/0023701 | A1* | 1/2020 | Salem | B64C 37/00 |
| 2023/0058202 | A1* | 2/2023 | Abdellatif | G05D 1/652 |
| 2024/0181825 | A1* | 6/2024 | Rocha | B64U 30/297 |

* cited by examiner

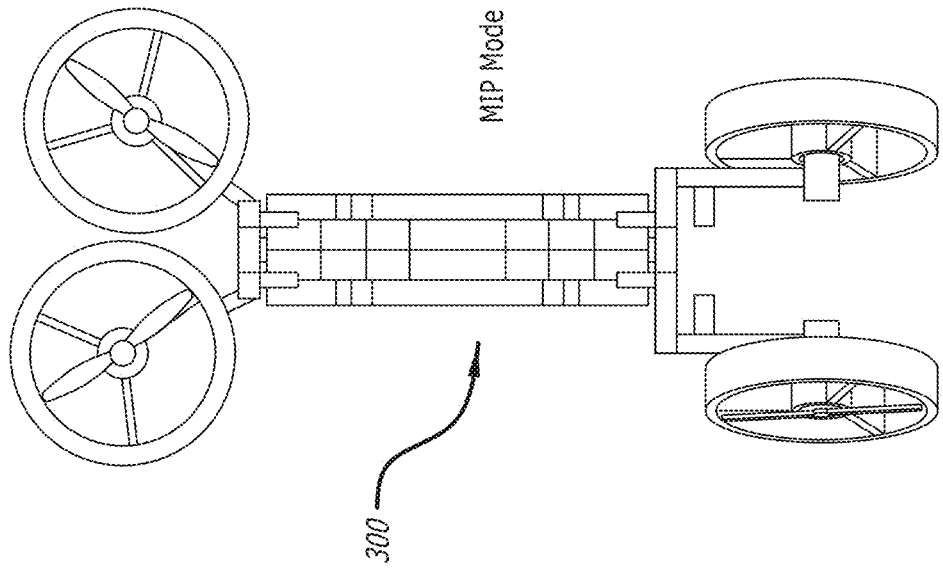
FIG. 3C
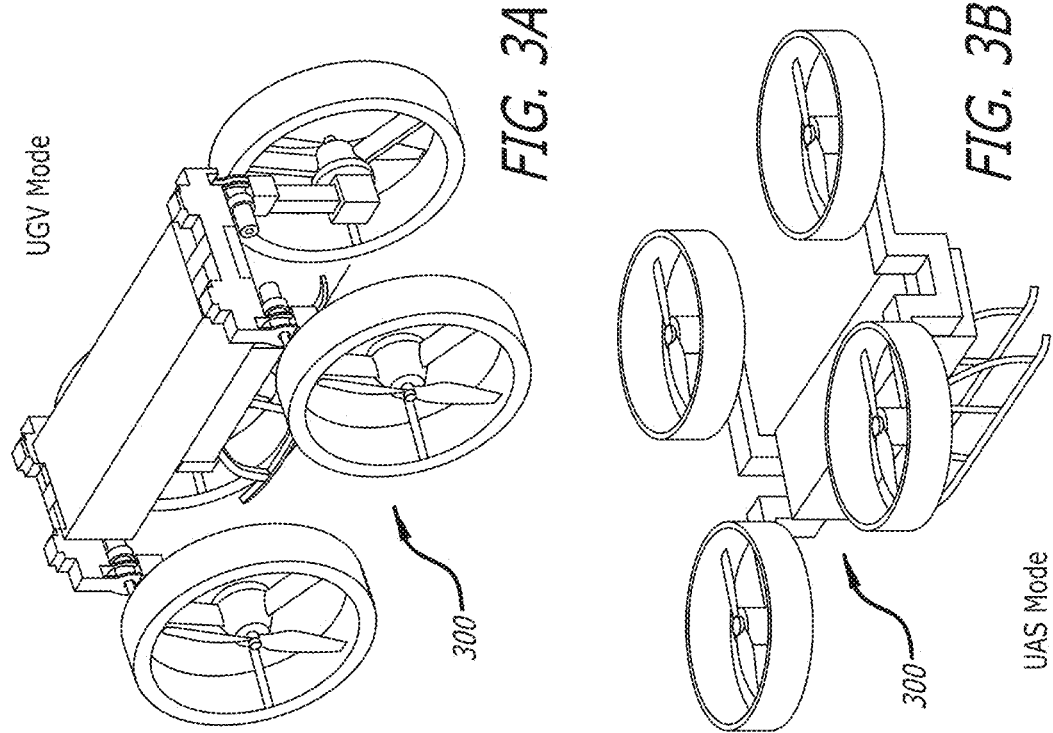
FIG. 3A
FIG. 3B

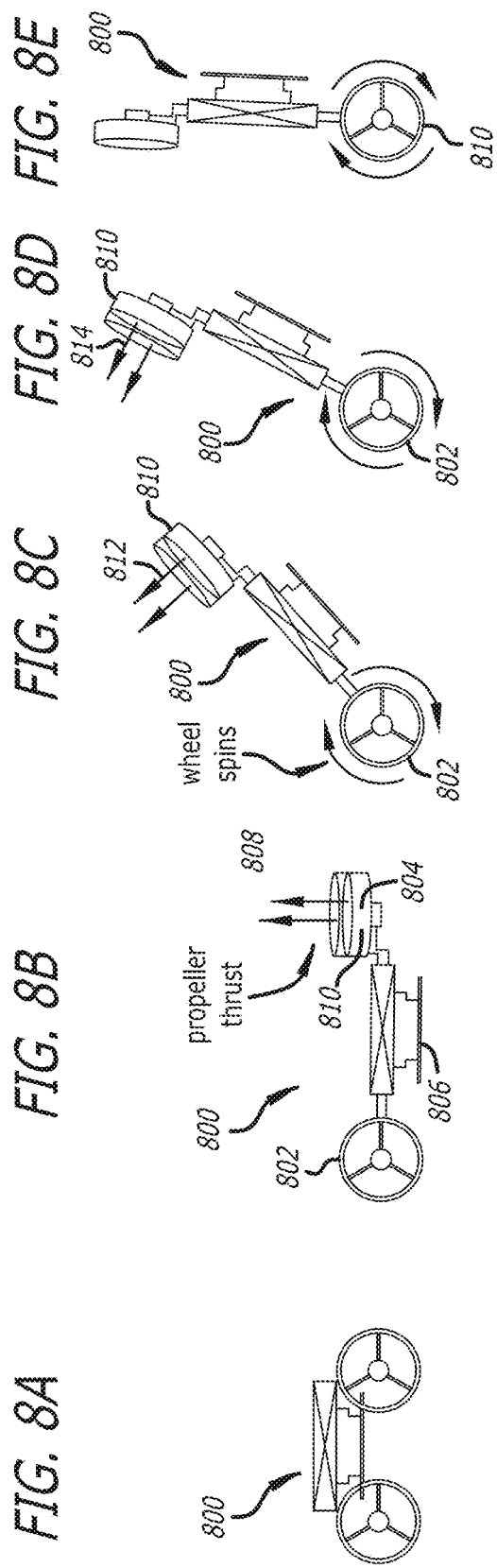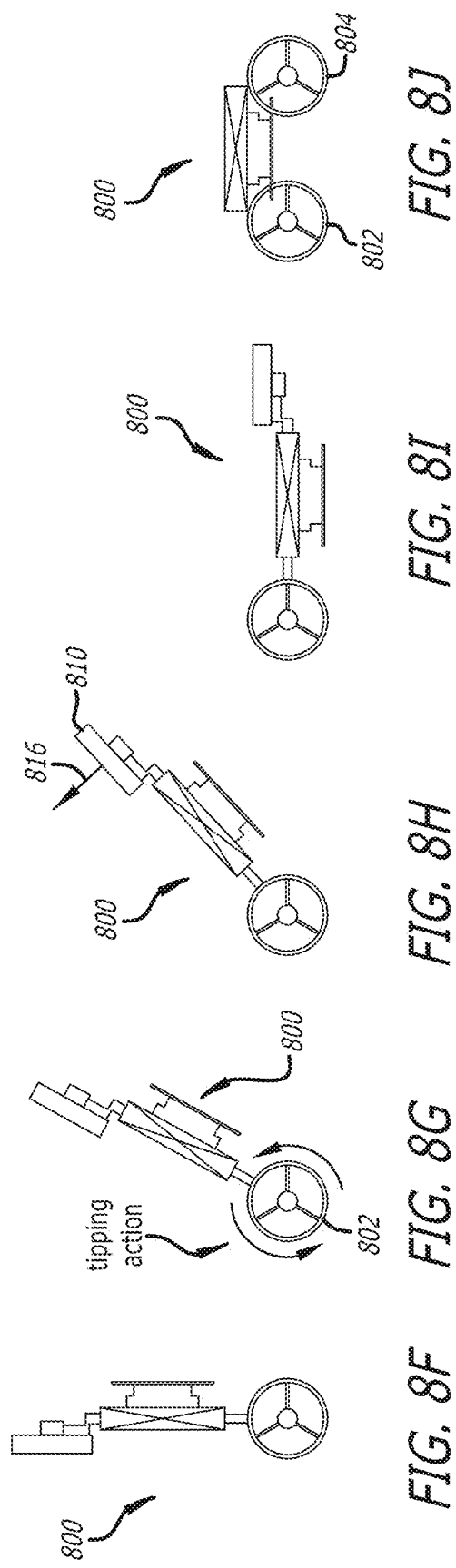

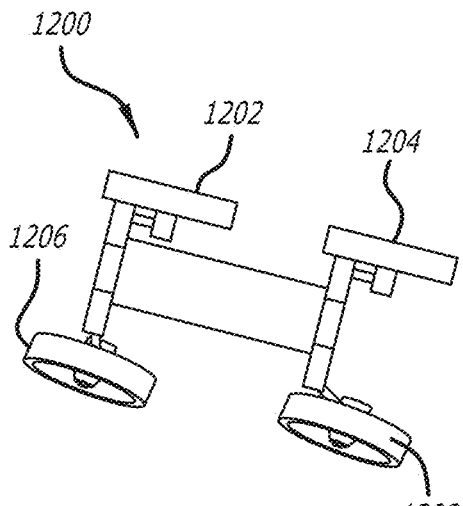
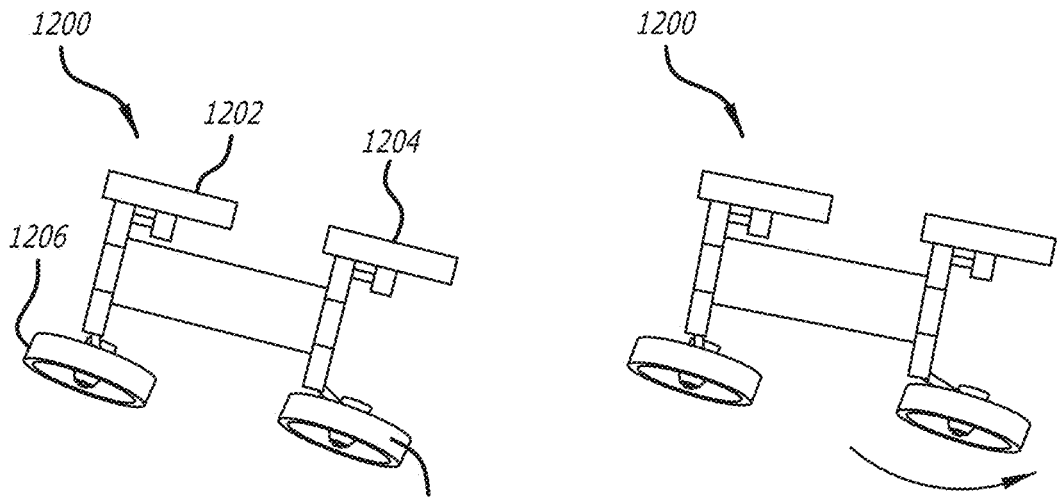
FIG. 12A          FIG. 12B
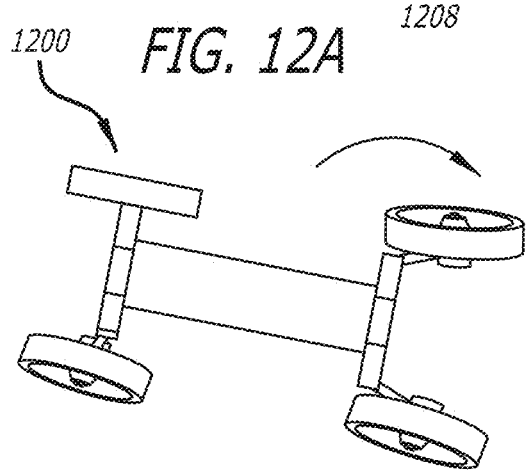
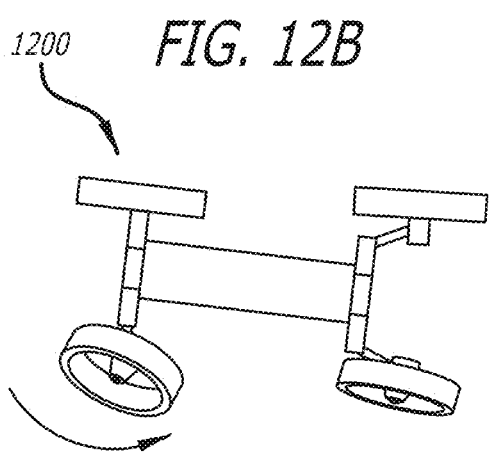
FIG. 12C          FIG. 12D
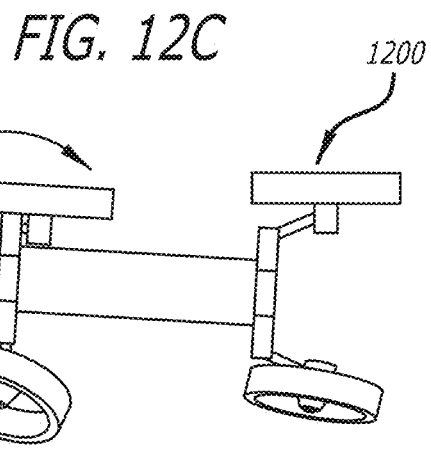
FIG. 12E

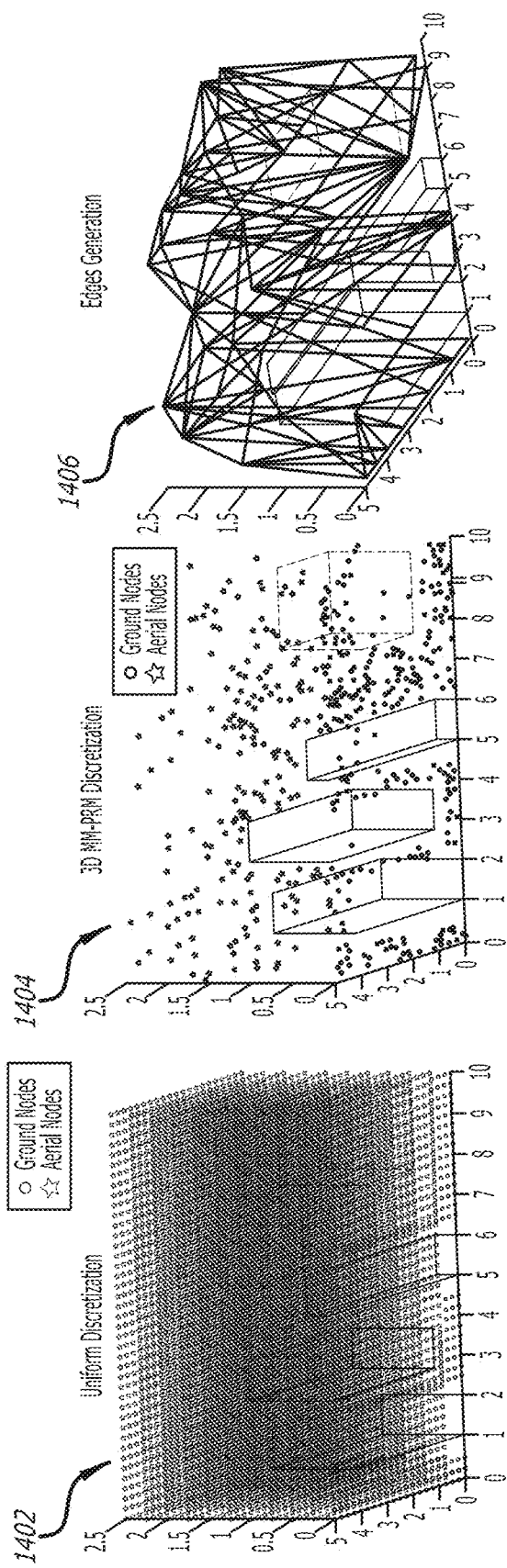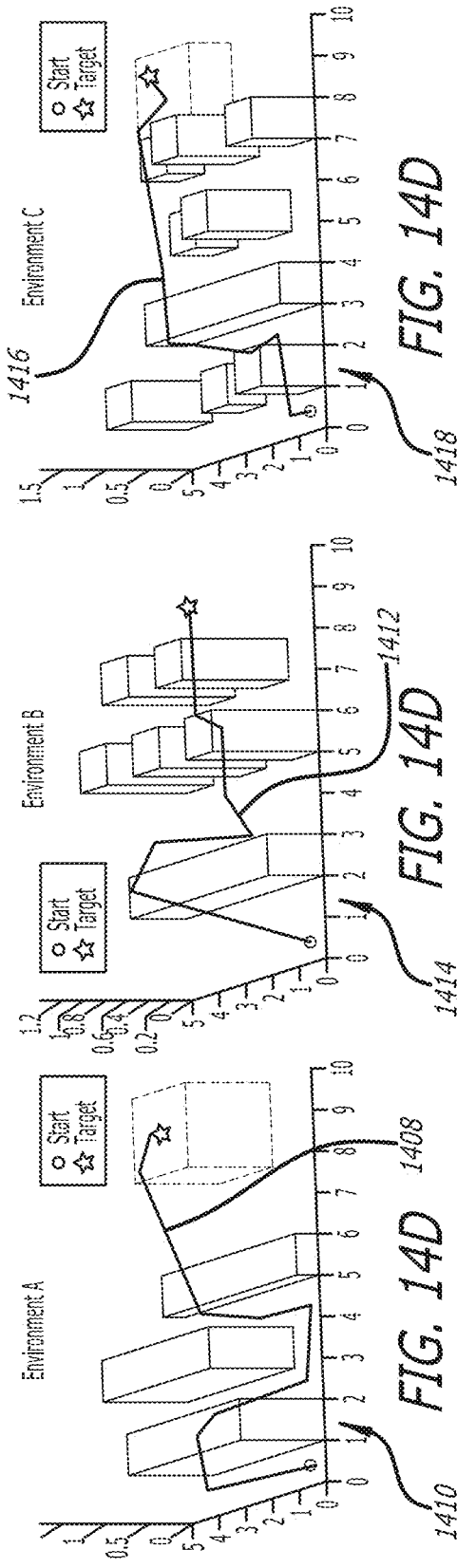
FIG. 14A
FIG. 14B
FIG. 14C
FIG. 14D

Algorithm 1: 3D MM-PRM Algorithm

Input: R radius of neighbors, Nw number of ground nodes, Nf number of aerial nodes
  Output: N and E respectively sets of nodes and edges
1 N ← ∅;
2 E ← ∅;
3 while n ≤ (Nw + Nf) do
4     if n ≤ Nw then
5        Xnew ← random ground node();
6     else
7        Xnew ← random ground node();
8     end
9     if obstacles free(Xnew) then
10        N ∪Xnew;
11        n ← n + 1
12        Xnearest ← nearest(N, R, Xnew);
13        for node ∈ Xnearest do
14           if clear edge(Xnew, node) then
15              E ∪{Xnew, node}
16           end
17        end
18     end
19 end
20 return N, E

FIG. 15

MULTI-MODAL MOBILITY UNMANNED VEHICLE

CROSS-REFERENCE TO RELATED APPLICATION

The current application claims the benefit of and priority under 35 U.S.C. § 119(e) to U.S. Provisional Patent Application No. 63/279,510 titled "Morphing, Multi-Modal (MR) Rover" filed Nov. 15, 2021, the disclosure of which is hereby incorporated by reference in its entirety for all purposes.

FIELD OF THE INVENTION

This invention relates to unmanned vehicles. More particularly it relates to multi-modal unmanned vehicles.

BACKGROUND

There are many bio-inspired designs where robotic structures are actively repurposed to accommodate mobility requirements for varying environment characteristics. When these adaptive structures are employed, the expected outcome is that they showcase locomotion resiliency and fault-tolerance as in the case with animals. However, the plasticity of locomotion traits achieved in existing robotic examples do not match that from by biological examples. Most multi-modal robots deal with task scenarios where comparably demanding conflicting requirements hosted by animals' locomotion apparatuses are not matched.

Among these examples, soft robots have demonstrated promising potentials since they present natural morphable structures which can be seamlessly tailored for multi-modal locomotion. There is a plethora of examples where morphing body or appendages are employed for adjustments in these robots' locomotion styles. For example, a caterpillar-inspired robot can switch between crawling and rolling. Or, another example is a soft-legged quadruped robot that can walk by pumping air to the air bladders inside the legs. While soft structures share strong similarities with shape-shifting biological mechanisms in vertebrates and invertebrates, these engineered elements cannot match biological counterparts in terms of generated force-motion profile per unit mass which is key to animals' successful multi-modal locomotion. As a result, most of these soft robots are designed for minor adjustments of gait characteristics. Also, other standard designs, where more conventional structures based on classical rigid links and joints are employed, have been considered to achieve multi-modal locomotion. These robots follow different design principles compared to soft systems, however, their overall design challenges share similar issues witnessed in soft systems because essentially the objectives remain unchanged. These robots are often designed based on biological templates that present less challenging locomotion plasticity. For instance, an amphibious robot that utilizes its legs and body movements to walk and swim, exploits the benefits that its environment offers, that is, buoyancy due to dense matter surrounding the robot, to alleviate actuation challenges. Objects when buoyant are lighter. As a result, if the actuators can generate joint torques that substantiate ground locomotion, they can match desired torque-motion profile under buoyancy too.

Other simplifications in design are justified by different interpretations of animal locomotion behavior. For instance, a quad-rotor which features rotate-able appendages for bounding flight to achieve small body footprints during aerial mobility, is inspired by birds' ability to adjust their body shapes during flight. Bounding flights performed by birds permit efficient soaring maneuvers without wing flapping which enhances birds' flight efficiency. Bounding flight presents complex control and hardware design challenges as birds' deployable wings dynamically switch between fully stretched and collapsed configurations. Other bio-inspired examples, including the design with transformable wheels, rims, and wheel-and-rims, share similar trends by assuming simplified scenarios to relax design challenges.

On the opposite end of the design spectrum, almost completely different from repurposing shape-shifting components to avoid redundancy, some robots exhibit multi-modal locomotion through redundancy. A redundant design tends to be less complex, as they are designed to carry additional actuators to maneuver on the new mode of locomotion. An example is a robot including quad-rotors with wheels and motors attached at the bottom of the robot to enable ground mobility for the initially aerial-only robot. However, this additional payload does not add any additional benefit to their flying performance. Redundancy can negatively affect their mobility and present significant ordeals particularly when scalability is an ultimate design objective.

Other redundant designs, called coupled-redundant, strategically have located mobility components such that their functions are not completely unrelated. While more effective compared to decoupled-redundant designs, so far the application of these coupled-redundant concepts have been limited to simple multi-modal scenarios. An example of such a robot is an amphibious robot, where the robot's wheels can either act as a drive wheel for ground locomotion, or propellers for swimming underwater by changing the orientation of the wheel axis. Another example is a Flying Star, which is a quad-rotor with move-able limbs and wheels at the end of its "legs", where it can lower its legs so the wheels are touching the ground and achieve ground mobility. These wheels are actuated using the propeller motor, so this actuator can transition between aerial or ground mobility through a change in morphology.

Some legged robots utilize wheels instead of feet to achieve simpler and more versatile ground locomotion on flat surfaces. The added versatility of using wheels instead of the foot is that they can stand up on the wheels and work like a bipedal robot. An example robot is capable of balancing on two wheels. By standing up on the hindlimbs, the robot dynamically balances into a Segway mode, which has a much smaller footprint and taller stance compared to the quadrupedal walking mode. The Segway mode can be advantageous in navigating tight spaces and allows the robot to use the additional height to climb or vault over taller obstacles. The additional height can also be used for scouting its surroundings using a camera at the edge of the robot's body.

SUMMARY OF THE INVENTION

A multi-modal robot can be capable of aerial mobility and ground mobility. In an embodiment the multi-modal robot includes a chassis, and a leg attached to the chassis. The leg includes a frontal hip joint. The frontal hip joint is capable of rotating around a frontal hip axis of rotation. The frontal hip axis of rotation is parallel to a longitudinal axis of the chassis. The leg can further include a first link having a first proximal end and a first distal end, where the first link is coupled at the first proximal end to the frontal hip joint. The leg can further include a sagittal hip joint, wherein the sagittal hip joint is coupled to the first distal end of the first link. The sagittal hip joint is capable of rotating around a sagittal hip axis of rotation, and the sagittal hip axis of rotation is parallel to a first link longitudinal axis. The leg can further include a second link, where the second link is coupled at a second proximal end to the sagittal hip joint. The leg can further include a wheel. The wheel is coupled to the second link at a first location, and the wheel configured to rotate around a wheel axis of rotation. The leg can further include a propeller, wherein: the propeller is co-axial with the wheel, and the propeller configured to rotate around the wheel axis of rotation.

In another embodiment, the chassis includes a frontal hip actuator, the frontal hip actuator connected to the frontal hip joint and configured to drive the frontal hip joint.

In a further embodiment, the multi-modal robot further includes a second leg, a third leg, and a fourth leg.

In an additional embodiment, the leg is movably attached to a frontal surface of the chassis.

In yet another embodiment, the first link includes a sagittal hip actuator.

In still another embodiment, the first link is perpendicular to the frontal hip axis of rotation.

In still yet another embodiment, the wheel and the propeller are driven by different actuators.

In a yet further embodiment, the first location is a second distal end on the second link.

In a still yet further embodiment, the wheel includes a wheel gear.

In yet another further embodiment, the wheel is driven by wheel actuator, the wheel actuator located along a length of the second link between the second proximal end and the first location.

In another embodiment again, the wheel is driven by a wheel actuator, and the wheel actuator is offset radially from the wheel axis.

In yet another embodiment again, the propeller is a direct-drive propeller.

In still yet another embodiment again, the propeller is driven by a propeller actuator, and the propeller actuator is coaxial with the wheel.

A multi-modal robot can be capable of transitioning from a prone position to a vertical inverted pendulum configuration. In an embodiment, the multi-modal robot includes a chassis with a longitudinal axis, and one or more propellers mounted to the chassis. The one or more propellers are capable of being driven by one or more propeller actuators and the one or more propeller actuators are capable of being controlled by one or more propeller actuator controllers. The multi-modal robot further includes a set of wheels mounted to a first end of the chassis, wherein the set of wheels is capable of being driven by one or more wheel actuators and the one or more wheel actuators are capable of being controlled by one or more wheel actuator controllers. The multi-modal robot further includes a memory; and a processor. The processor is configured to execute instructions to command the multi-modal robot to transition from a first position in which the chassis longitudinal axis is generally parallel to ground to a second position in which the chassis longitudinal axis is generally perpendicular to ground by: generating first propeller actuator controller instructions capable of causing the one or more propellers to generate thrust such that the chassis tracks a first pitch rate until a first cutoff pitch, and causing the chassis to rotate from the first position to the second position; generating first wheel actuator controller instructions capable of causing the set of wheels to provide torque, and causing the chassis to rotate from the first position to the second position; generating second propeller actuator controller instructions capable of causing the one or more propellers to generate thrust such that the chassis tracks a second pitch rate until a second cutoff pitch, and causing the chassis to rotate from the first position to the second position; and generating second wheel actuator controller instructions capable of causing the set of wheels to rotate, and maintaining the second position of the chassis.

In a further embodiment, the one or more propellers are mounted to the chassis, and the one or more propellers can be positioned relative to the chassis.

In a yet further embodiment, each of the one or more propellers is configured to be coaxial with a wheel from a second set of wheels.

In a still further embodiment, the one or more propellers are mounted to a second end of the chassis, and the second end of the chassis is located opposite to the first end of the chassis.

In a further embodiment again, each wheel of the set of wheels is mounted to the chassis, and each wheel of the set of wheels can be positioned relative to the chassis.

In an additional further embodiment, the multi-modal robot further includes an exteroceptive sensor mounted to a second end of the chassis, wherein the second end of the chassis is located opposite to the first end of the chassis.

In another further embodiment, the multi-modal robot further includes a network interface.

In a still yet further embodiment, the first pitch rate is around 10 degrees/second.

In a yet further embodiment again, the first wheel actuator controller instructions are capable of causing set of wheels to provide torque to move the first end of the chassis generally underneath the one or more propellers.

In an additional yet further embodiment, the second pitch rate is around 5 degrees/second.

In another yet further embodiment, the first propeller actuator controller instructions are first thrust-vectoring instructions, and the second propeller actuator controller instructions are second thrust-vectoring instructions.

In an additional still further embodiment, the first thrust-vectoring instructions and the second thrust-vectoring instructions are based on proportional-integral-derivative control.

A device can be configured to command a multi-modal robot to follow a trajectory to a target, where the multi-modal robot is capable of transitioning between an unmanned ground vehicle configuration and an unmanned aerial vehicle configuration. In an embodiment, the device includes a memory; and a processor. The processor configured to execute instructions to receive a 3D environment description including a starting node and a target node, generate a set of ground nodes based on the 3D environment description, generate a set of aerial nodes based on the 3D environment description, and generate a set of edges connecting a composite set of nodes. The composite set of nodes includes the set of ground nodes and the set of aerial nodes. The processor further configured to assign a set of costs to the set of edges based on a ground traversal cost for ground traversal between ground nodes, an aerial traversal cost for aerial traversal between aerial nodes, and a transition cost for transitioning between an unmanned ground vehicle configuration and an unmanned aerial vehicle configuration. The processor further configured to generate a trajectory from a starting node to a target node based on a total cost, where the total cost determined based on a subset of costs associated with a subset of edges, and generate instructions capable of causing the robot to move based on the generated trajectory.

In an additional embodiment, the multi-modal robot is capable of automatically transitioning between an unmanned ground vehicle configuration and an unmanned aerial vehicle configuration.

In another additional embodiment, the 3D environment description includes a set of obstacles.

In an additional embodiment again, the set of obstacles includes obstacles selected from a list including ground vehicle traversable objects and non-ground vehicle traversable objects.

In yet another additional embodiment, generating a set of ground nodes based on the 3D environment description includes using a probabilistic road map algorithm for discretization.

In still another additional embodiment, generating a set of ground nodes based on the 3D environment description includes using a uniform discretization algorithm for discretization.

In yet still another additional embodiment, generating a set of edges includes generating a set of edges that do not intersect any obstacles.

In still another additional embodiment again, the trajectory is generated based on an A* algorithm.

In still yet another additional embodiment again, the trajectory is generated based on a Dijkstra algorithm.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIGS. 3A-C conceptually illustrate an example of a multi-modal morphing robot depicted assuming UGV, MIP, and UAS configurations.

FIGS. 8A-J conceptually illustrate an example multi-modal morphing robot transitioning from a four-wheeled ground vehicle configuration to a mobile inverted pendulum vehicle configuration and back.

FIGS. 12A-E conceptually illustrate an example multi-modal morphing robot performing a crawling gait on a rocky surface.

FIGS. 14A-F conceptually illustrate several example path-planning optimization methods for multi-modal robots.

FIG. 15 conceptually illustrates an example 3D MM-PRM algorithm.

DETAILED DESCRIPTION

Figure 1A:
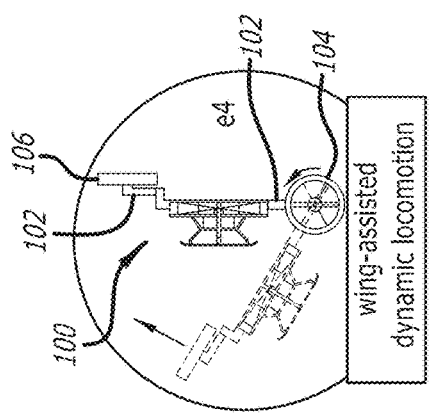
FIGS. 1A-H conceptually illustrate an example of a multi-modal morphing robot in various configurations.

Robot designs can take many inspirations from nature, where there are many examples of animals exhibiting highly flexible and fault-tolerance locomotion strategies, and taking advantage of their morphology to navigate complex terrains. Robotic biomimicry of animals' appendage repurposing can yield mobile robots with unparalleled capabilities. In various embodiments a multi-modal morphing robot can be capable of negotiating unstructured, multi-substrate environments including land and/or air by transforming its shape and/or body configuration to realize different forms of mobility. The robot can feature transformable limbs. In several embodiments, a multi-modal morphing robot can change its shape to perform several modes of locomotion, including (1) flying, (2) rolling, (3) crawling, (4) crouching, (5) dynamic balancing (e.g., thruster-assisted two-wheel mobility), (6) tumbling (e.g., four-wheel to two-wheel transitions or vice versa), (7) scouting, and (8) loco-manipulating objects while balancing. In accordance with embodiments of the invention a robot can be configured, mechanically and in terms of control design to use morphing capabilities to navigate unstructured terrains.

In several embodiments, a multi-modal morphing robot includes a transformable body structure and multi-functional methods of actuation. The robot can be configured to perform various modes of locomotion. In accordance with several embodiments of the invention the robot is capable of transforming between and/or operating in several mobility modes. The mobility modes can include unmanned ground vehicle (UGV) mode, mobile inverted pendulum (MIP) mode, unmanned aerial system (UAS) modes, thruster-assisted MIP mode, ground mobility in tight spaces mode, legged crawling locomotion mode, and loco-manipulation mode. The mechanical design, and/or control algorithms, in some embodiments, are configured to enable changing between and operation in the aforementioned modes. In numerous embodiments the multi-modal morphing robot can use automated navigation, with the help of motion capture cameras, to follow a trajectory generated by a path planning algorithm based on a multi-modal probabilistic road map (MM-PRM) and A* algorithms.

In various embodiments, a multi-modal morphing robot can be capable of negotiating unstructured, multi-substrate environments including land and air. In several embodiments, the robot can transform its shape and body configuration to realize different forms of mobility. In accordance with several embodiments of the invention a multi-modal morphing robot can (1) fly, (2) roll, (3) crawl, (4) crouch, (5) balance (e.g., thruster-assisted two-wheel balancing), (6) tumble (e.g., four-wheel to two-wheel and two-wheel to four-wheel transitions), (7) scout, and/or (8) loco-manipulate objects while balancing. Several embodiments of the robot can be configured for use in a broad number of applications including search and rescue operations, space exploration, automated package handling in residential spaces, digital agriculture, and/or other applications.

The multi-modal morphing robot can reconfigure its body configuration to achieve mobility that fits diverse mission requirements (e.g., search and rescue missions) in accordance with various embodiments of the invention. This can be particularly useful in situations including in response to natural disasters, such as flooding or windstorm. In the aftermath of incidents such as flooding, one event may accompany another event that differently destroys a landscape. A hurricane may produce flooding as well as wind damage to roads and buildings. Or, a landslide may cause the movement of a large mass of rock down a slope, dam a river and create a flood. In these scenarios, when ground locomotion is not feasible, multi-modal morphing robots can provide important strategic situational awareness involving aerial surveying and reconnaissance through multi-purpose scans of the area with the suite of sensors (e.g., exteroceptive sensors) which, in several embodiments, are integrated into its design.

In several embodiments the multi-modal morphing robot can use multiple configurations to navigate complex situations. For instance, when flight is not suitable, the robot can leverage its statically (e.g., four-contact-point rover) and/or dynamically stable wheeled mobility (e.g., two-contact-point Segway mode, two-wheeled and/or mobile inverted pendulum mode) achieved through a multi-modal morphing robot's ability to repurpose its mobility components by morphing. When mobility inside tight collapsed corridors is needed, a multi-modal morphing robot can adjust its adaptive body structure to pass through. Wheeled mobility has limitations such as that it cannot handle rough terrain conditions where obstacles are larger than the wheel size. In these situations, aerial mobility may not be possible because of environmental confinement. To overcome such a situation, a multi-modal morphing robot can leverage the ability to dynamically balance itself and achieve a height advantage to pass over large obstacles. The mobile inverted pendulum mode can also provide a better vantage point for reconnaissance as it permits the exteroceptive sensors to be raised to look over obstacles when flight is not possible.

In several embodiments, mobility elements can be repurposed to enhance locomotion plasticity, perception, and/or manipulation abilities. Multi-modal robots can, in several embodiments, fly, roll, crawl, crouch, balance (e.g., thruster-assisted two-wheel balancing), tumble (e.g., perform four-wheel to two-wheel and two-wheel to four-wheel transitions), scout (e.g., raise a line of sight sensor), and/or loco-manipulate objects while balancing.

This modal diversity differentiates various embodiments of the invention from existing, state-of-the-art, multi-modal platforms. For instance, while soft robots with shape-shifting structures have demonstrated multi-modal locomotion before, these robots are typically designed for minor adjustments of gait characteristics with very limited self-contained operations. Other conventional non-soft designs are designed based on biological templates that present less challenging locomotion plasticity such as quadrupedal animals that can stand or reptiles that can swim. Conversely, several embodiments of the invention encode a wide range of locomotion behaviors in a single robot.

In several embodiments, mobility components including legs, wheels, and thrusters can be repurposed. Mobility component repurposing provide powerful mobile robot solutions that can provide adaptability over ground substrate but also can fly by crossing boundaries of ground-aerial mobility. Component repurposing can be effective to create scalable designs.

Multi-Modal Mobility

Turning now to the drawings, systems and methods for implementing multi-modal mobility unmanned vehicles in accordance with various embodiments of the invention are illustrated.

Figure 1B:
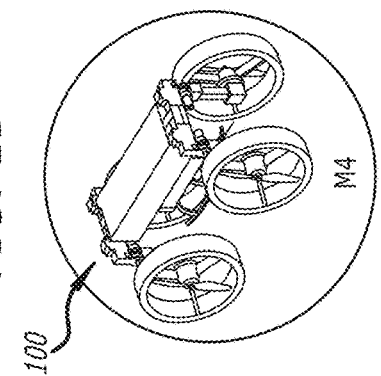
Figure 1C:
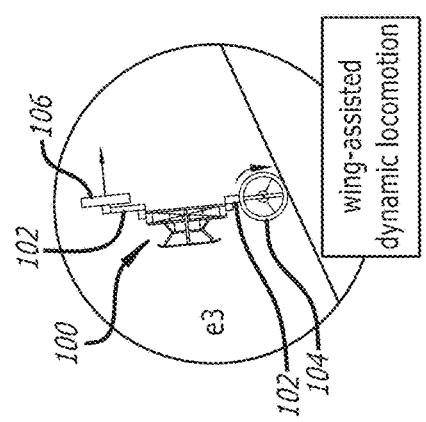
Figure 1D:
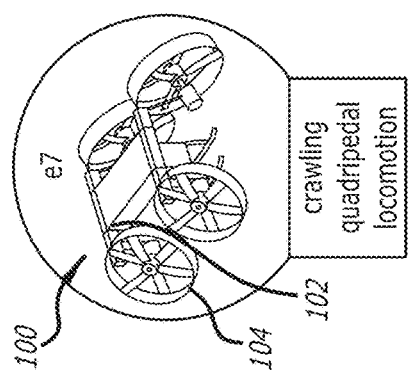
Figure 1E:
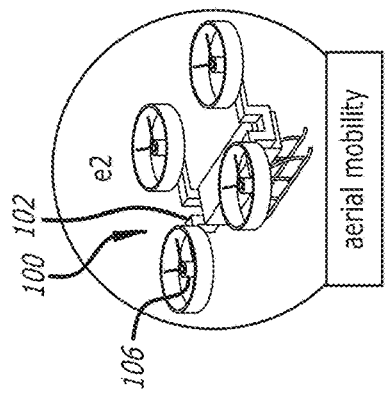
Figure 1F:
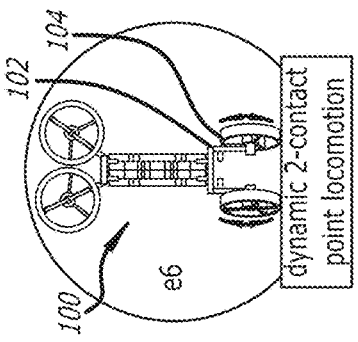
Figure 1G:
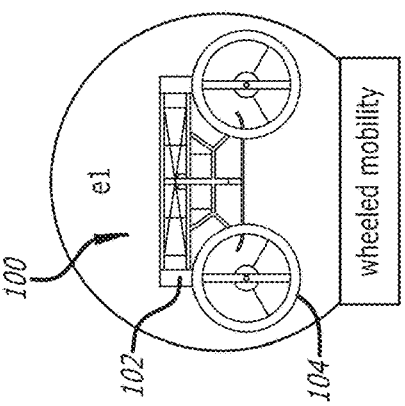
Figure 1H:
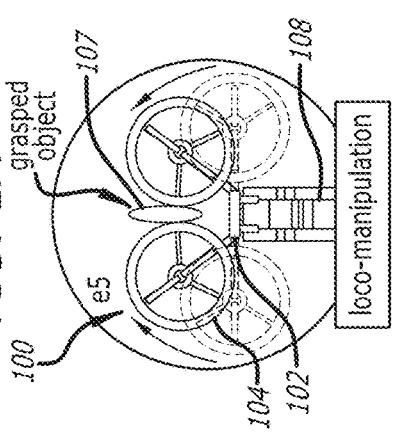

In accordance with many embodiments of the invention, a multi-modal morphing robot is capable of operating in and/or transitioning between various configurations. An example multi-modal morphing robot in various configurations is conceptually illustrated in FIGS. 1A through 1H. FIG. 1A illustrates a multi-modal morphing robot 100 in a wheeled mobility configuration. In a wheeled mobility configuration, a set (e.g., four) of legs 102 can position a set (e.g., four) of wheels 104 to be generally in ground contact. Wheeled mobility configurations can, in several embodiments, be statically stable. FIG. 1B illustrates the multi-modal morphing robot 100 in an aerial mobility configuration. In an aerial mobility configuration, the set of legs 102 can position a set (e.g., four) thrusters suitably for flight. FIG. 1C illustrates the multi-modal morphing robot 100 in a wing-assisted incline locomotion configuration. In a wing-assisted incline locomotion configuration a first pair of legs 102 can position a pair of wheels 104 for ground contact, and a second pair of legs 102 can position a pair of thrusters to provide thrust tending to move the robot up an incline. FIG. 1D illustrates the multi-modal morphing robot 100 in a wing-assisted dynamic locomotion configuration. In a wing-assisted dynamic locomotion configuration, a first pair of legs 102 can position a pair of wheels 104 for ground contact, and a second pair of legs 102 can position a pair of thrusters 106 to provide thrust tending to move the robot 100 to a vertical position. FIG. 1E illustrates the multi-modal morphing robot 100 in a loco-manipulation configuration. In a loco-manipulation configuration a pair of legs 102 can move a pair of wheels 104 to grasp an object between the wheels. In several embodiments, the loco-manipulation configuration allows the multi-modal morphing robot to grasp an object 107 between its wheels. The wheels 104 can be configured to rotate to drive the object 107 towards the body 108. FIG. 1F illustrates the multi-modal morphing robot 100 in a dynamic 2-contact point locomotion configuration. In a dynamic 2-contact point locomotion configuration a pair of legs 102 can position a pair of wheels 104 to maintain the robot 100 dynamically stable while performing ground movement. FIG. 1G illustrates the multi-modal morphing robot 100 in a crawling quadrupedal locomotion configuration. In a crawling quadrupedal locomotion configuration, the legs 102 can position the wheels 104 at non-orthogonal angle to a horizontal plane of the robot 100 thereby reducing a height of the robot, wherein the horizontal plane of the robot 100 is generally parallel to the ground at least when the robot 100 is in a wheeled mobility configuration. FIG. 1G illustrates the multi-modal morphing robot 100 in a wheeled mobility configuration from a perspective view.

In several embodiments a multi-modal morphing robot can be capable of interchangeably switching its modes of mobility between wheeled, aerial, dynamic 2-contact point, quadrupedal, and wing-assisted dynamic locomotion. This can allow the robot the resiliency and fault tolerance needed to traverse an unstructured environment reliably.

While specific processes and/or systems in connection with a multi-modal morphing robot in various configurations are discussed above, any of a variety of processes and/or systems can be utilized for a multi-modal morphing robot in various configurations as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps, modes, and/or components can be rearranged or omitted. Although the above embodiments of the invention are described in reference to a multi-modal morphing robot in various configurations, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 2A:
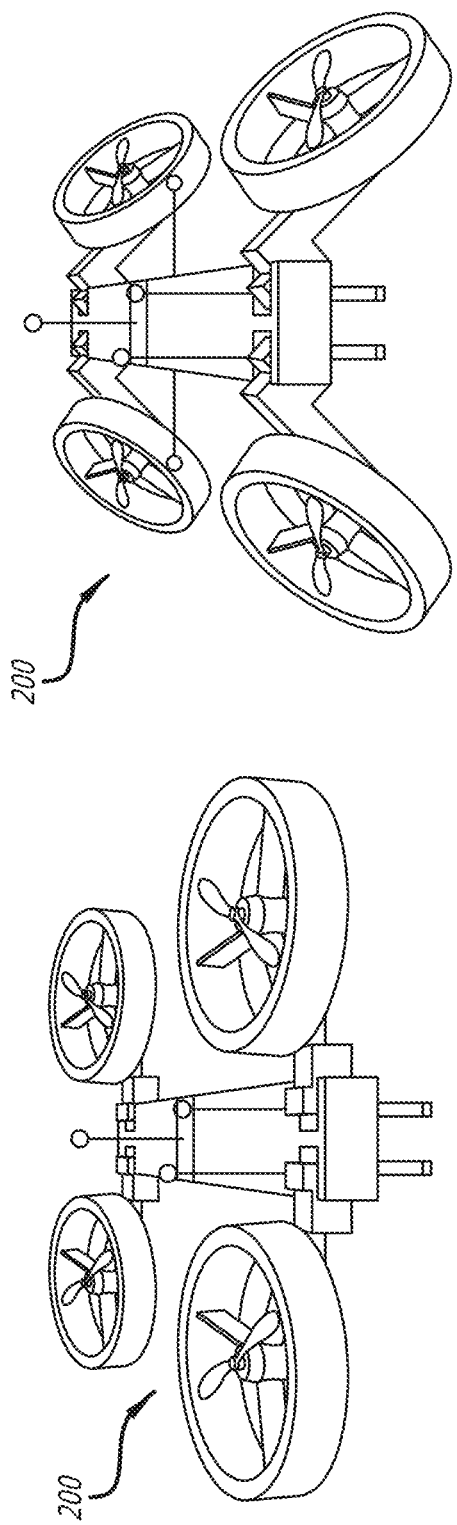
FIGS. 2A-C conceptually illustrate an example of a multi-modal morphing robot depicted assuming wheeled, quadrupedal crawling, and flying configurations.
Figure 2B:
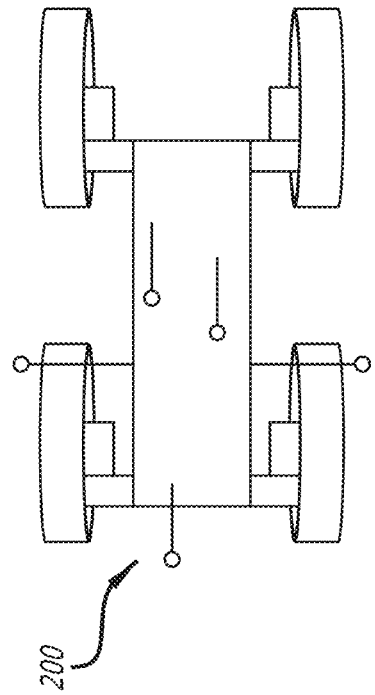
Figure 2C:
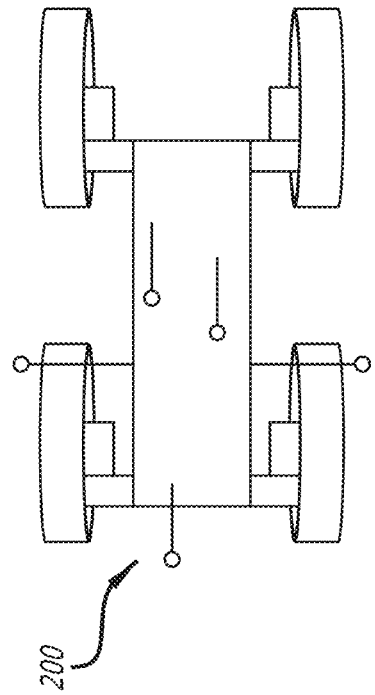
Figure 4A:
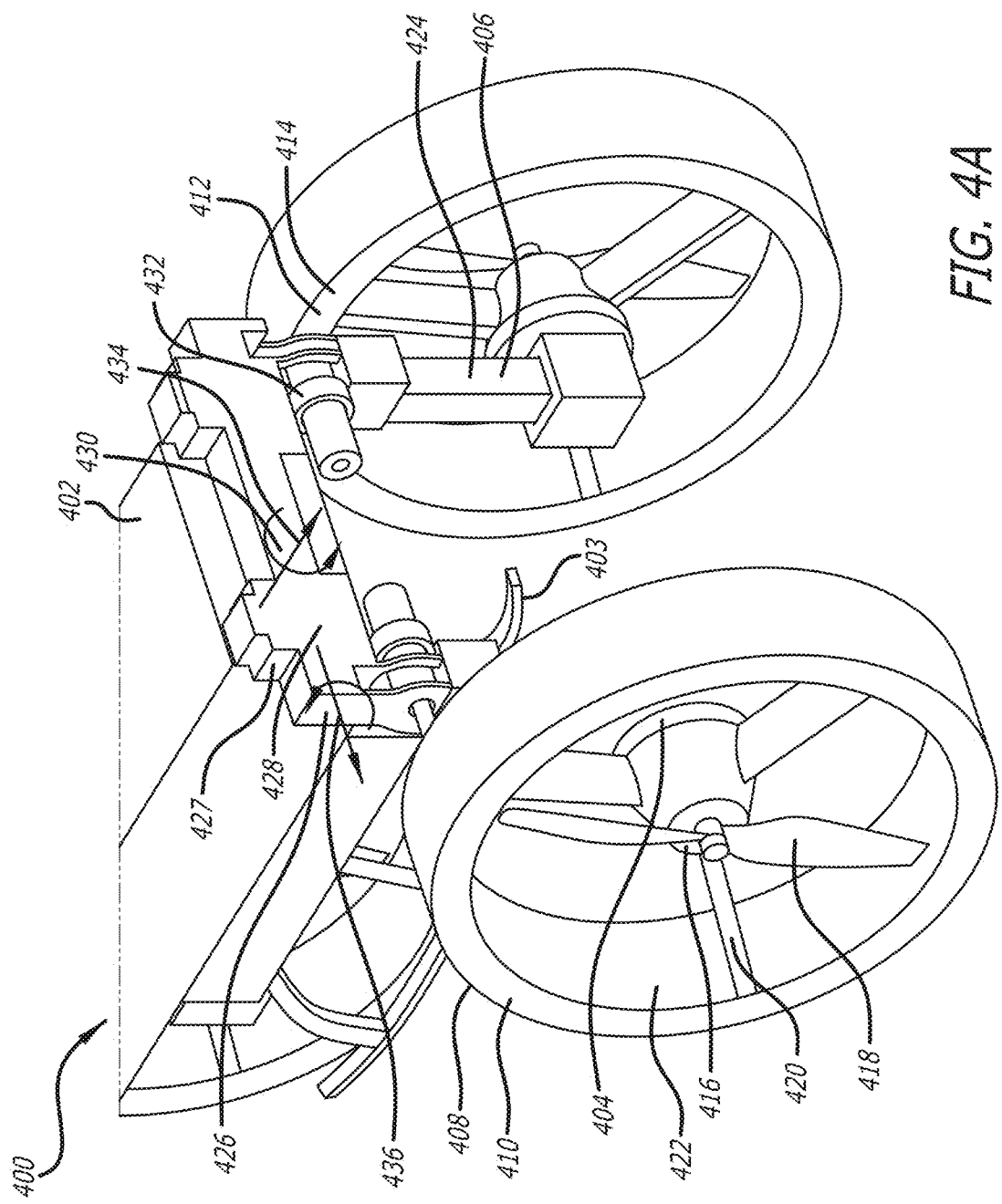
FIGS. 4A-E conceptually illustrate an example mechanical design and components overview of a multi-modal morphing robot.
Figure 4B:
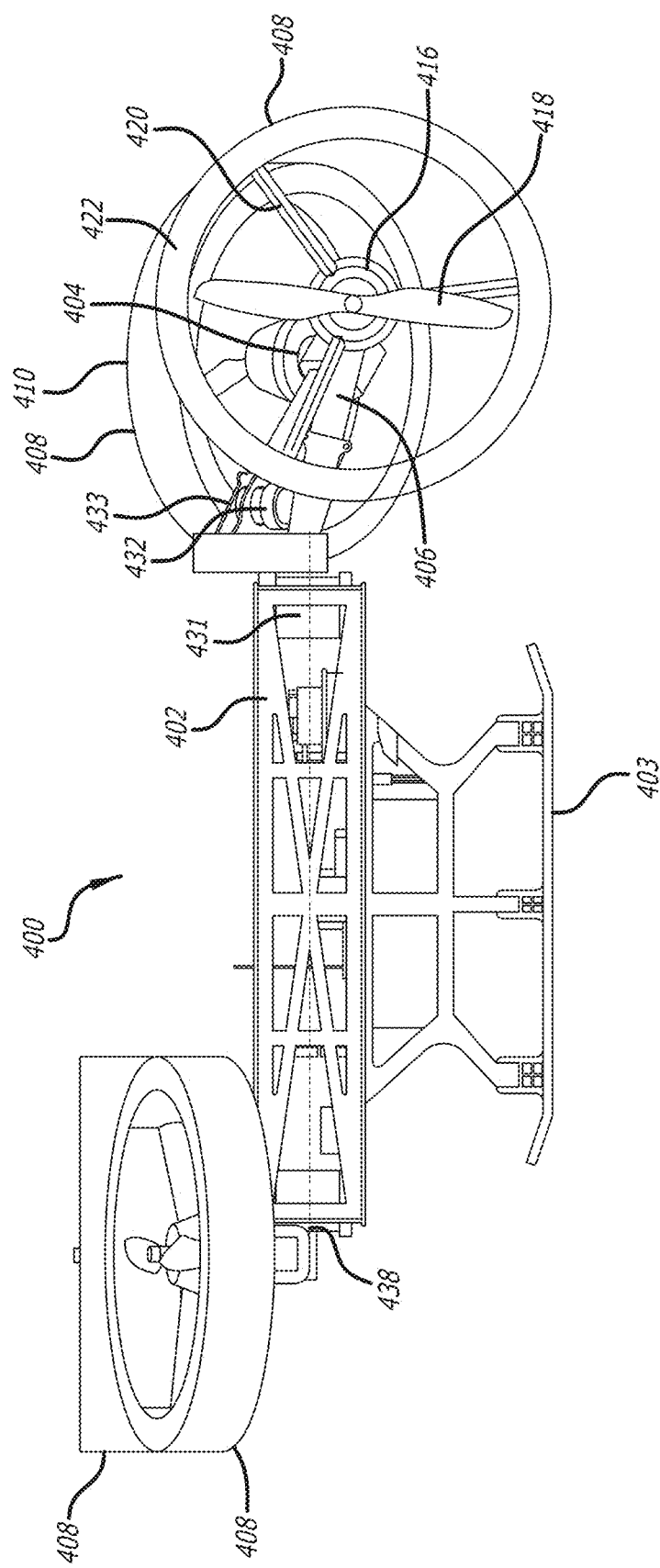
Figure 4C:
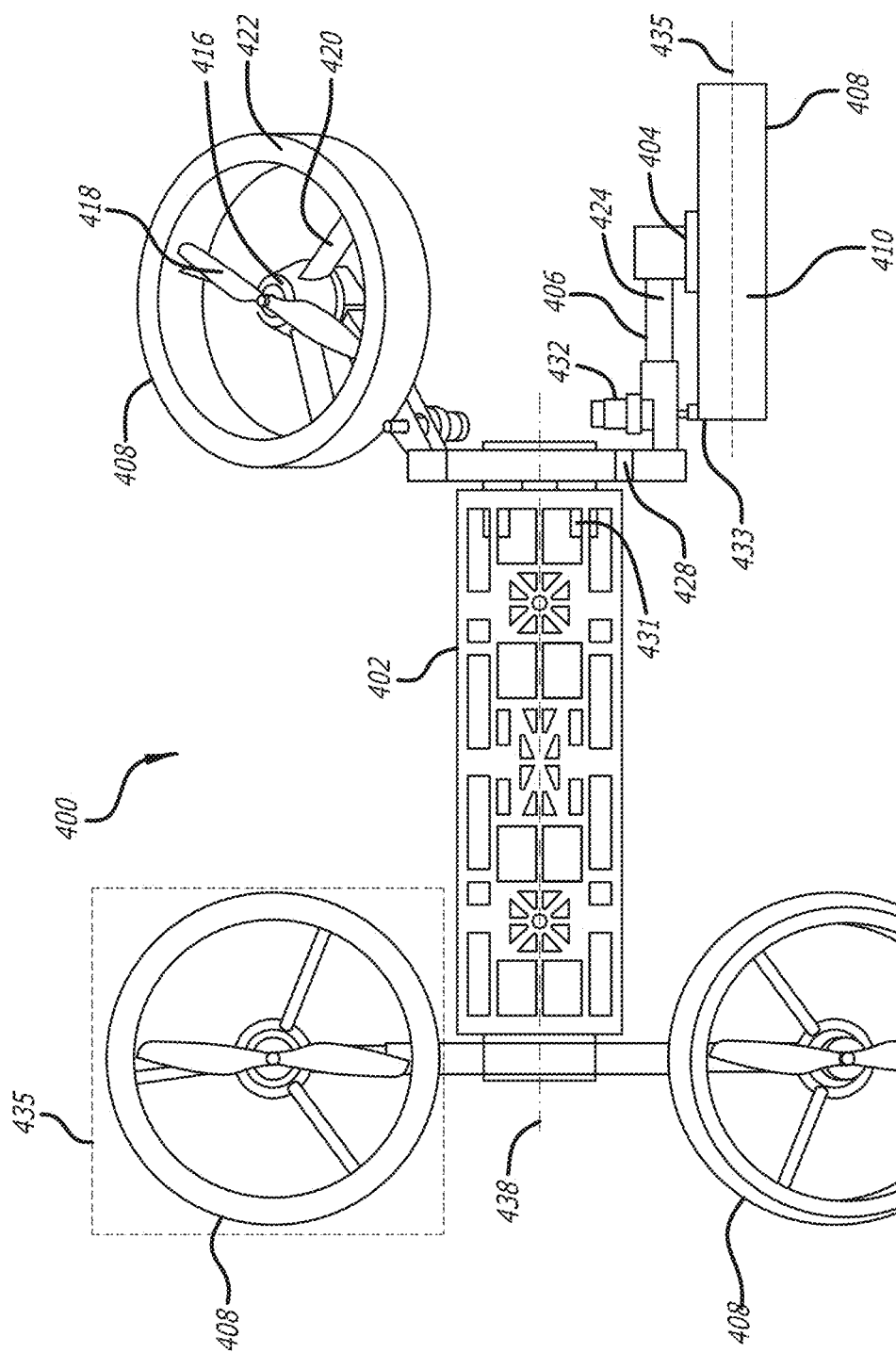
Figure 4D:
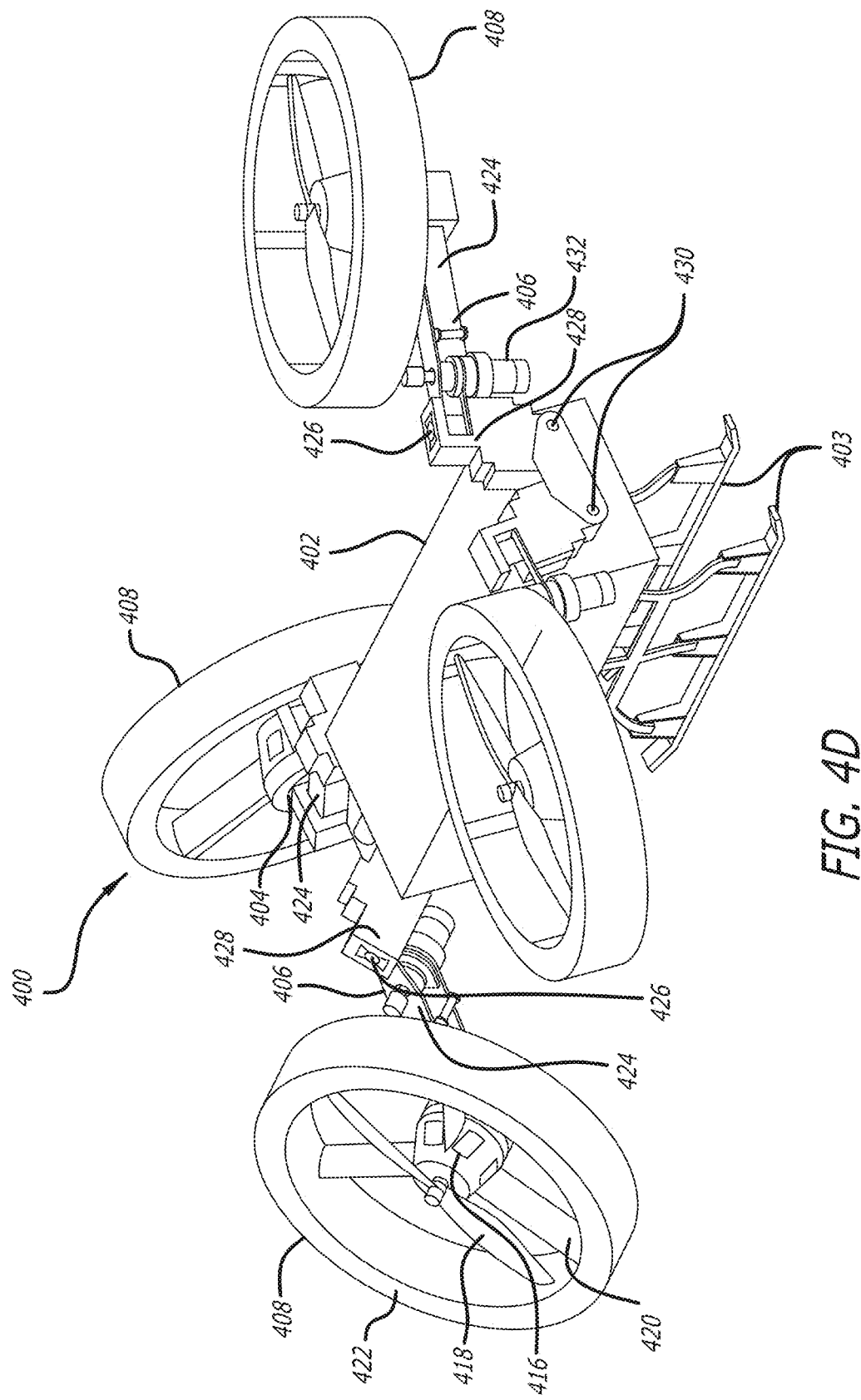
Figure 4E:
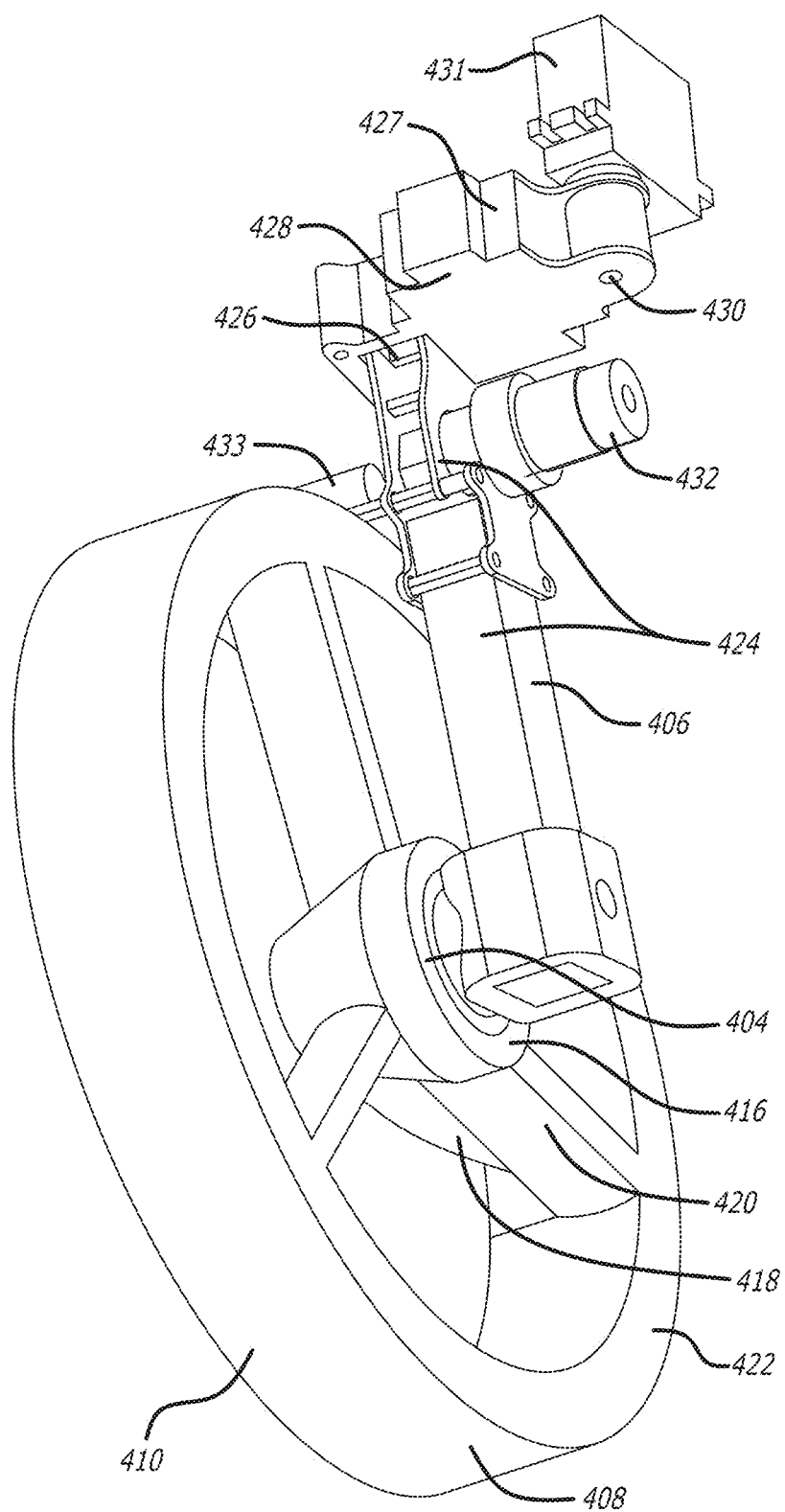

In various embodiments, a multi-modal morphing robot can transition between wheeled, quadrupedal crawling, and/or flying configurations. An example multi-modal morphing robot is depicted assuming wheeled, quadrupedal crawling, and/or flying configurations in FIG. 2A-C. FIG. 2A depicts a multi-modal morphing robot 200 in a flying configuration. FIG. 2B depicts a multi-modal morphing robot 200 in a quadruped configuration. FIG. 2C depicts a multi-modal morphing robot 200 in a wheeled configuration.

In some embodiments, the robot can weigh approximately 5.6 kg with all electronics including onboard computer and batteries, can measure around 70 cm in length, can measure around 35 cm in width, and/or can measure around 35 cm in height when in UGV mode. When dynamically balancing on its two wheels, in accordance with several embodiments of the invention, the robot can reach around 100 cm tall. Dynamic balancing on two wheels can permit a robot to reach a better vantage point for reconnaissance and monitoring using its exteroceptive sensors in ground mode. In numerous embodiments, the robot can lower its main body toward the ground to reduce its height. This can be useful to pass through low-height overhead pathways. A multi-modal morphing robot can have legs which, including the wheels, are around 28 cm long. Wheels mounted to the robot can be 25 cm in diameter, in several embodiments. When in UAS configuration, in accordance with a number of embodiments of the invention, a multi-modal morphing robot can be around 30 cm tall. In various embodiments, a robot's propellers' center points can reach a maximum distance of 45 cm far apart from each other. In accordance with embodiments of the invention, each propeller-motor combination can generate a maximum thrust force of approximately 2.2 kg-f reaching roughly 9 kg-f in total for four propulsion units.

While specific processes and/or systems in connection with a multi-modal morphing robot depicted assuming wheeled, quadrupedal crawling, and flying configurations are discussed above, any of a variety of processes and/or systems can be utilized for a multi-modal morphing robot depicted assuming wheeled, quadrupedal crawling, and flying configurations as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal morphing robot depicted assuming wheeled, quadrupedal crawling, and flying configurations, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

In accordance with many embodiments of the invention, a multi-modal morphing robot can transition between unmanned ground vehicle (UGV), mobile inverted pendulum (MIP), and/or unmanned aircraft system (UAS) configurations. An example multi-modal morphing robot is depicted assuming UGV, MIP, and UAS configurations in FIGS. 3A-C. FIG. 3A depicts a multi-modal morphing robot 300 in a UGV configuration. FIG. 3B depicts a multi-modal morphing robot 300 in a UAS configuration. FIG. 3C depicts a multi-modal morphing robot 300 in a MIP configuration.

While specific processes and/or systems in connection with a multi-modal morphing robot depicted assuming UGV, MIP, and UAS configurations are discussed above, any of a variety of processes and/or systems can be utilized for a multi-modal morphing robot depicted assuming UGV, MIP, and UAS configurations as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal morphing robot depicted assuming UGV, MIP, and UAS configurations, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

In numerous embodiments, design choices enable the multi-modal morphing robot to assume various configurations. An example mechanical design and components overview of a multi-modal morphing robot is conceptually illustrated in in FIGS. 4A-E. A multi-modal morphing robot 400 can include a chassis 402 with landing gear 403. The chassis 402 can be attached to a hub 404 via a leg 406. In several embodiments, the robot can include two, three, four, or another number of legs. In accordance with embodiments of the invention, each leg can be mounted to a hub. The hub 404 can be rotatably coupled to a wheel 408. The wheel 408 can include an outer portion 410 and an annular wheel gear 412. In various embodiments the outer portion 410 is configured for ground contact. The wheel gear 412 can include gear teeth 414 around an outer circumference. The hub 404 can be fixedly coupled to a propeller motor 416. The propeller motor 416 can be drivingly coupled to a propeller 418. The hub 404 can be attached via struts 420 to an annular support structure 422. The struts 420 can be positioned within the annular support structure 422. The propeller 418 can be positioned within the annular support structure 422. The hub 404 can be connected to a distal link 424. The distal link 424 can rotate around a sagittal hip joint 426. Rotation around the sagittal hip joint 426 can be achieved using a sagittal hip joint servo motor 427. The sagittal hip joint 426 can be attached to proximal link 428. The proximal link 428 can rotate around a frontal hip joint 430. Rotation around the frontal hip joint 430 can be achieved using a sagittal hip joint servo motor 431. The hip joint servo motor 431 can be fixed relative to the chassis 402. A wheel motor 432 can be mounted along the distal link 424 between the hub 404 and the sagittal hip joint 426. The wheel motor 432 can be drivingly coupled to the wheel gear 412. A wheel motor gear 433 can mesh with the wheel gear 412.

In several embodiments, frontal hip joints can allow rotational motion about frontal hip axis (e.g., frontal hip axis 434). A frontal hip axis can be parallel to a wheel plane (e.g., wheel plane 435). A wheel plane can be a plane that intersects the wheel along a circle. The wheel plane can be parallel or coincident with a plane bisecting a cylinder along a circular cross-section, the cylinder defining a wheel. A frontal hip axis can be parallel with a longitudinal axis of a multi-modal morphing robot chassis.

In accordance with many embodiments of the invention, sagittal hip joints can allow rotational motion about a sagittal hip axis (e.g., sagittal hip axis 436). A sagittal hip axis can be perpendicular to a frontal hip axis. A sagittal hip axis can be perpendicular to a wheel plane. Wheel planes are described elsewhere herein. A sagittal hip axis can be perpendicular to a longitudinal axis (e.g., longitudinal axis 438) of a multi-modal morphing robot chassis.

In various embodiments, the chassis, leg structures, and/or wheel components can be formed (e.g., primarily formed) of 2-mm carbon fiber plates, square carbon tubes, and/or 3D-printed parts. 3D-printed parts, can in some embodiments, be parts fabricated using a fiber-inlay process based on Onyx thermoplastic materials and/or by a Mark-Forged 3D printer. In several embodiments, frontal hip joints and/or sagittal hip joints can have large ranges of motion (e.g., the range of motion can be sufficient for the joints to allow a multi-modal robot to assume any of the various configurations described elsewhere herein). In several embodiments, the large range of motions in the joints substantiates the transformation between UGV, UAS, and MIP configurations as described elsewhere herein.

Actuation of multi-modal morphing robots, in accordance with some embodiments of the invention can be separated into three types: aerial, wheeled, and joint actuation. Actuators to achieve actuation can be electro-mechanical and can be attached to legs. Each leg can have two hip servo motors (e.g., Hi-Tec HSB-9380TH), each placed along the frontal and sagittal axes to regulate the leg orientation relative to the main body. As such, the frontal actuators translate the legs sideways. The swing motions of the legs are generated by the sagittal actuators. In some embodiments, the hi-Tec HSB-9380TH servo motor can be used because of its high power density and good thermal properties, which ensures servos' long-lasting operation times. In several embodiments, a wheel motor (e.g., Pololu 25D HP12V) is attached near the top of the wheel to drive a wheel gear. In accordance with various embodiments of the invention, brushless motors are used since they possess high energy densities and are easier to drive near zero speeds compared to brushed motors of similar specifications. In numerous embodiments, a propeller motor (e.g., Garila J2514 1500 KV) can be attached in the middle of the wheel with a propeller (e.g., a 2-blade, 3-blade, or other bladed propeller). In various embodiments, the propeller is 8 inches in diameter, or another size. In some embodiments, the motor and propeller combination can generate 2.2 kg of thrust at maximum throttle with a current draw of 50A when a 6S 4000 mAh lithium-polymer battery is used.

In some embodiments the weight of a multi-modal morphing robot can be around 5.6 kg in total. The weight can include, in accordance with various embodiments of the invention, a chassis assembly weighing around 940 g, one or more microcontrollers weighing around 115 g, communication systems weighing around 120 g, power electronics weighing around 80 g, cables, fasteners, etc. weighing around 440 g, hip servos (×8) weighing around 560 g, propeller motors (×4) weighing around 270 g, wheel motors (×4) weighing around 380 g, tire assemblies (×4) weighing around 1600 g, and/or motor drivers (×4) weighing around 107 g.

In several embodiments, all of a multi-modal morphing robot's actuators can be attached to the legs. The leg joints, servos, wheel, propeller, control systems and/or motor design and/or placements can be configured to enable performance of transformation and exhibition of the multi-modalities discussed herein.

Multi-modal morphing robots, in accordance with many embodiments of the invention are designed to fly and to have wheels. A difficult to carry all of these actuators as the robot can become too heavy to fly. Additionally, the knee joints of a quadruped are typically held at an angle, which means that the knee servo/motor must exert continuous torque to maintain its posture. The constant load might cause heat issue or requires a larger motor to work well, which can add significant weight to the robot. As shown in Table 1, the actuators contribute the most to our total payload. The frontal and sagittal hip joints are sufficient to transform the robot to UAS and MIP configurations, as shown in FIG. 2-B. Therefore, we decided not to use knee actuators in our design, which limits walking capability but significantly reduces the payload of our robot.

In many embodiments, propellers and flight motors can be selected to lift a robot that weighs around 5 kg. Propellers and/or flight motors can be placed inside wheels in various embodiments. Placing propellers and/or flight motors inside wheels can protect the components. In some embodiments, wheels can act as air ducts for propellers to help with propulsion. In several embodiments, a wheel and propeller (e.g., a propeller mounted inside the wheel) can be actuated to spin around a common axis of rotation. Several designs can address this issue, in accordance with embodiments of the invention, including using belt system, and/or clutch mechanisms to drive the wheel and propeller with the same motor.

Still, in various embodiments, the propeller can be directly actuated by a propeller motor. The wheel, in accordance with embodiments of the invention can be actuated using an off-axis motor (e.g., wheel motor) driven through the spur gear attached to a wheel rim. In various embodiments, a wheel motor can have a fixed position relative to the propeller motor. The wheel motor and propeller motor can both be mounted to a common link. In various embodiments, both the wheel motor and the propeller motor can be fixedly mounted to a link at a position distal to a joint attached to the link. The wheel motor can be mounted on a link between a joint on the li9nk and a propeller motor on the link. The wheel rim can include a wheel gear. In several embodiments the wheel motor and the propeller motor can be mounted to a shared link. The wheel motor and the propeller motor can have fixed relative locations (e.g., the wheel motor and propeller motor can be mounted with no joints between them). In various embodiments the offset between the propeller motor and the leg motor can be approximately equal to the radius of the wheel and/or a driving surface of the wheel gear.

While specific processes and/or systems in connection with mechanical design and components overview of a multi-modal morphing robot are discussed above, any of a variety of processes and/or systems can be utilized for a mechanical design and components overview of a multi-modal morphing robot as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a mechanical design and components overview of a multi-modal morphing robot, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 5:
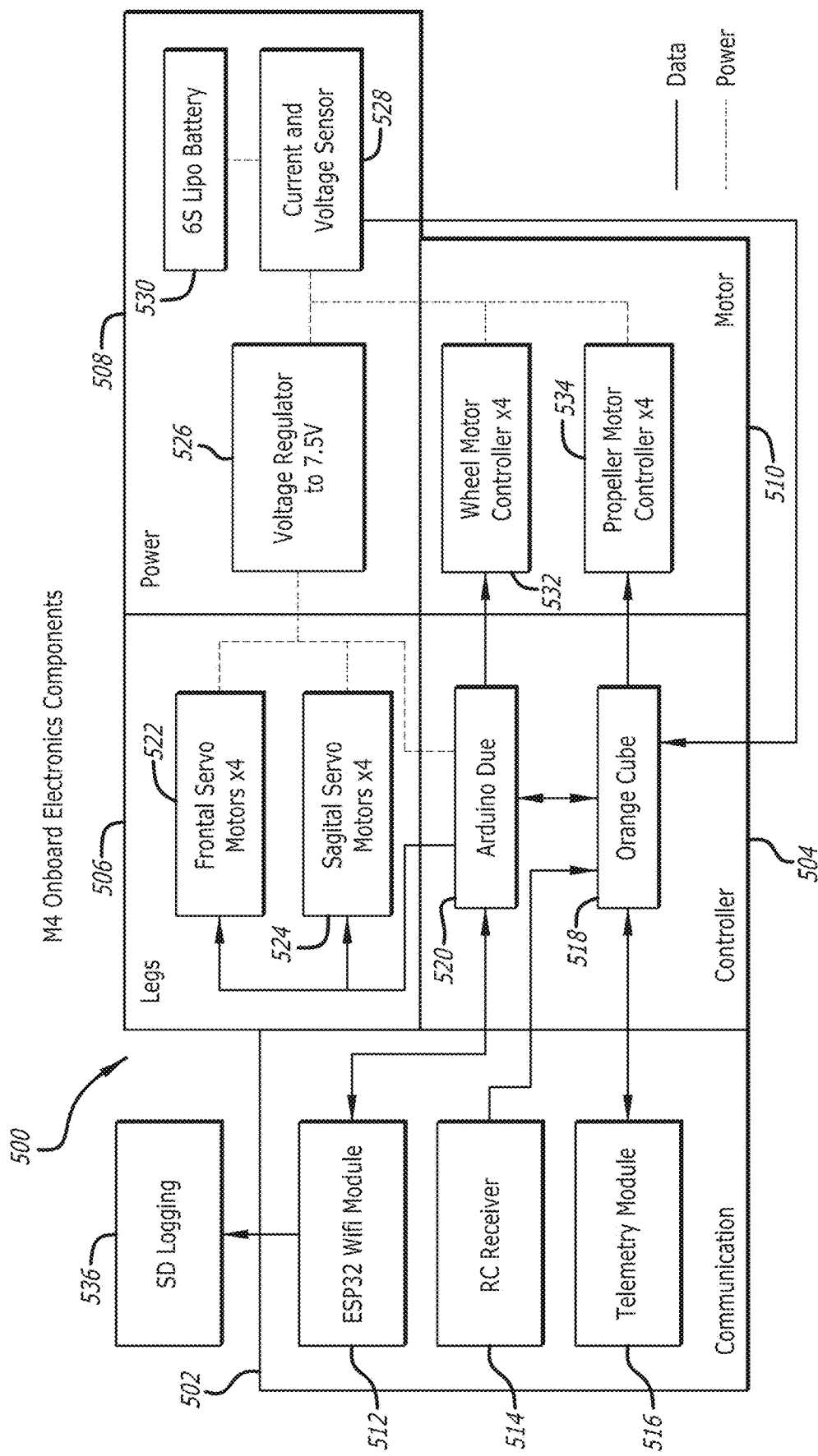
FIG. 5 conceptually illustrates an example system of onboard electronic components for a multi-modal morphing robot.

In various embodiments a multi-modal morphing robot can include onboard electronic components. An example system of onboard electronic components for a multi-modal morphing robot is conceptually illustrated in FIG. 5. An onboard electronic components system 500 can include a communication system 502, a controller system 504, a leg system 506, a power system 508, and a motor system 510. The communication system 502 can include a WiFi module 512 (e.g., ESP32 Wifi Module), an RC receiver 514, and a telemetry module 516. The controller system 504 can include a flight controller 518 (e.g., Orange cube), and a wheel and hip controller 520 (e.g., Arduino Due). The leg system 506 can include one or more (e.g., four) frontal actuators (e.g., servo motors) 522 and one or more (e.g., four) sagittal actuators (e.g., servo motors) 524. The power system 508 can include a voltage regulator (e.g., voltage regulator to 7.5V) 526, a current and voltage sensor 528, and a power source (e.g., battery, 6S LiPo battery) 530. The motor system 510 can include one or more (e.g., four) wheel motor controllers 532, and one or more (e.g., four) propeller motor controllers 534. The system 500 can include a memory (e.g., SD logging system) 536. The flight controller 518 can be in data communication with the telemetry module 516, the RC receiver 514, the wheel and hip controller 520, the current and voltage sensor 528, and the one or more propeller motor controllers 534. The wheel and hip controller 520 can be in data communication with the WiFi module 512, the one or more wheel motor controllers 532, the one or more sagittal actuators 524, and the one or more frontal actuators 522. The WiFi module 512 can be in data communication with the memory system 536. The one or more frontal actuators 522 can be in power communication with the wheel and hip controller 520 and the voltage regulator 526. The one or more sagittal actuators 524 can be in power communication with the wheel and hip controller 520 and the voltage regulator 526. The voltage regulator 526 can be in power communication with the current and voltage sensor 528, the one or more wheel motor controllers 532, and the one or more propeller motor controllers 534. The current and voltage sensor 528 can be in power communication with the power source 530, the one or more wheel motor controllers 532, and the one or more propeller motor controllers 534.

A multi-modal morphing robot can have robot wheel and hip actuation controlled using a first controller (e.g., using Arduino Due) and flight can be controlled using a second controller (e.g., Orange Cube and/or ADS-B Carrier Board) in various embodiments. In some embodiments, the second controller (e.g., the flight controller, the orange cube) can include and/or receive communications from one or more (e.g., three) inertial measurement units (IMUs), one or more (e.g., two) barometers, and one or more (e.g., one) magnetometer. In accordance with several embodiment of the invention, wheel and propeller motors can be powered with a motor driver (e.g., a brushed motor driver, a brushed motor driver TB67H420FTG) and an electronic speed controller (ESC) (e.g., APD 80F3). In many embodiments, a telemetry module and/or an RC receiver can be attached to a flight carrier board for communication with a ground station and/or for receiving a user's manual commands, respectively. A WiFi network interface (e.g., an ESP32 development board) can be used, in several embodiments, to handle WiFi communications. WiFi communications can be used with a motion capture computer and/or to log data to memory (e.g., a SD card).

In various embodiments each of the following modes has a corresponding control design (e.g., low-level locomotion control): wheeled, quadrupedal crawling, aerial, UGV-MIP transition, MIP, and aerial mobility.

The ground mobility using four wheels (UGV mode), in several embodiments, can be controlled using classical posture kinematics models (PKM) widely used in mobile robotics. A skid-steer driving mechanism can be used to perform turning maneuvers in several embodiments. A skid-steer driving mechanism can include a control scheme where the left- and right-side wheels spin in the opposite directions in order to regulate the heading angle of the vehicle. Wheel commands can be determined by mixing the forward and turning rates of each wheel.

The UAS mode, in accordance with embodiments of the invention, can be controlled using an Orange Cube's ArduPilot flight stack which is an open-source flight controller algorithm for standard multi-rotor systems. In several embodiments, the robot has approximately 1.6 thrust to weight ratio, resulting in a decent maneuverability for both manual and automated flight.

In accordance with embodiments of the invention a communication protocol (e.g., Mavlink) can be to send commands through serial from the Arduino Due to the Orange Cube. The protocol can be used to send motion capture measurements to the robot, takeoff and landing commands, and/or the target positions for tracking the desired trajectory. In accordance with many embodiments of the invention, a multi-modal morphing robots can be required to follow multi-modal trajectories as further discussed elsewhere herein. The robot, in several embodiments can be programmed to transform between the UGV and UAS modes when the next target position requires a change from aerial to ground modes and/or vice versa.

In many embodiments, the UGV-MIP configuration transition achieved with the help of thrusters (e.g., propellers) in multi-modal morphing robots presents dynamical characteristics wherein the aerodynamic forces generated by the thrusters generate the ground reaction forces needed to maintain force balance on a steep surface. During the UGV-MIP transition, in accordance with embodiments of the invention, a multi-modal robot can adjust contact forces by using back-EMF in the wheels, which act like active break systems, and/or thrust-vectoring. When in MIP mode, multi-modal robots can use thrusters to boost mobility.

The multi-modal morphing robots transformation into a MIP configuration can be performed in two steps. A first step can be a body transformation to repurpose wheel to thruster. A second step can be a self-uprighting maneuver through thrust-vectoring.

To perform a body transformation to repurpose wheel to thruster, in various embodiments, the rear side of the robot's sagittal joints can extend outwards until the sagittal joints are parallel to the body. The front side hip joints can rotate such that the thrusters point upwards and can be arranged as close to the center of the body as possible.

To perform a self-uprighting maneuver, in accordance with many embodiments of the invention, the robot can activate the thrusters in a post-transformation configuration to lift the robot into an inverted pendulum position. Then, the propellers can be turned off and the MIP balancing controller can be activated once the robot has reached the upright position near the inverted pendulum's unstable equilibrium (dynamic stability).

The thruster-assisted self-uprighting maneuver used by the multi-modal morphing robot has several merits compared to the classical methods based on inverted pendulum on moving cart. Traditionally, a pendulum on a moving cart can perform a self-uprighting maneuver by saturating the wheel speed in one direction, then instantaneously reversing the wheel direction the other way. The counter-electromotive force generated by the moving wheels can effectively double the stall torque and current in the motor to generate enough torque and lift the robot into the upwards position. However, the additional torque and impulsive actuation can lead to failures in the mechanical components and overload the motors and power electronics. Further, larger motors might also be required in these systems depending on the weight of the robot, which can add a significant weight into the system. In various embodiments, a multi-modal robot can use existing synergy in a multi-modal robot's design based on back-EMF and thrust-vectoring to alleviate actuation challenges in MIP mode. Using the thrusters, the uprighting forces can be applied gently, and a motor with a minimally sufficient speed-torque curve to perform the dynamic balancing maneuver can be selected.

In several embodiments, the control design for the MIP-UGV transition maneuver can follow thrust-vectoring based on a PI controller that tracks the desired pitch rates for smooth lift-off. During the uprighting maneuver, in numerous embodiments, the wheels can be used to assist the uprighting maneuver by providing additional torques and moving the bottom side of the robot underneath the propellers. In several embodiments, the desired pitch rate can be set to 10°/s. The pitch rate can be reduced to 5°/s near the upright position. In many embodiments, an MIP controller can be activated close to a zero initial condition (e.g., a pitch rate near zero), resulting in a stable transition into the MIP mode.

In accordance with a number of embodiments of the invention, an MIP controller can be separated into the θ and φ stabilization, where a state feedback controller is used.

$$\theta r = k1p(\phi - \phi r) + k1d(\phi' - \phi' r) \qquad \text{equation(3)}$$

$$uw = k2p(\theta - \theta r) + k2d\theta', \qquad \text{equation(4)}$$

where $uw \in [-1, 1]$ is the PWM duty and direction for the wheel motors, θr is the reference pitch angle, φr is the reference wheel angle, kip and kid terms are the controller gains, $i \in \{1, 2\}$.

In many embodiments, an MIP mode can be underactuated and can exhibit non-minimum phase behavior, where it must tilt in the direction of movement for a stable movement. This is reflected in equation (3), where the encoder measurements on the wheels, based on which processes can determine a reference pitch angle for the robot. Based on equation (4) processes can determine motor commands to stabilize the robot's pitch.

While specific processes and/or systems in connection with a system of onboard electronic components for a multi-modal morphing robot are discussed above, any of a variety of processes and/or systems can be utilized for a system of onboard electronic components for a multi-modal morphing robot as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a system of onboard electronic components for a multi-modal morphing robot, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

In various embodiments, forces can be modelled as applying to point masses. A free-body diagram for dynamic modeling of an example multi-modal morphing robot is conceptually illustrated in FIG. 6. A free body model 600 can include a body mass 602, a hip mass 604, a leg mass 606, and a wheel mass 608. The body mass 602 can include a mass of a landing gear, a chassis, and one or more components (e.g., electronic components mounted in the chassis). The hip mass 604 can include a mass of a hip link, hip (e.g., frontal and/or sagittal) joint portions, and/or hip mounted actuators and electronic components. The leg mass 606 can include a mass of a leg link, a wheel motor, a propeller motor, a wheel, and/or a hub. Under some conditions, the landing gear can be subjected to landing gear ground forces 610. The landing gear ground forces 610 can be modelled as acting on the body mass 602. The hip mass 604 can, under some conditions, be subjected to a hip frontal torque 612. The hip frontal torque 612 can be applied by a hip frontal actuator. The hip frontal torque 612 can tend to rotate a hip link around a frontal hip axis 614. The leg mass 606 can be subjected to a hip sagittal torque 616. The hip sagittal torque 616 can be applied by a hip sagittal actuator. The hip sagittal torque 616 can tent to rotate the leg link around a hip sagittal axis 618. The hip sagittal axis 618 can be perpendicular to the hip frontal axis. The wheel mass 608 can be subjected to a wheel torque 620, a propeller force 622, and/or a wheel ground force 624 under various conditions. The wheel torque 620 can be applied around a central of the wheel. The wheel torque can be applied by the wheel motor. The propeller force 622 can be applied normal to a plane intersecting the wheel along a circle. The propeller force 622 can be applied by the propeller motor. The wheel ground force 624 can be applied perpendicular to a ground surface.

While specific processes and/or systems in connection with a free-body diagram for dynamic modeling of a multi-modal morphing robot are discussed above, any of a variety of processes and/or systems can be utilized for an a free-body diagram for dynamic modeling of a multi-modal morphing robot as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to an free-body diagram for dynamic modeling of a multi-modal morphing robot, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 7:
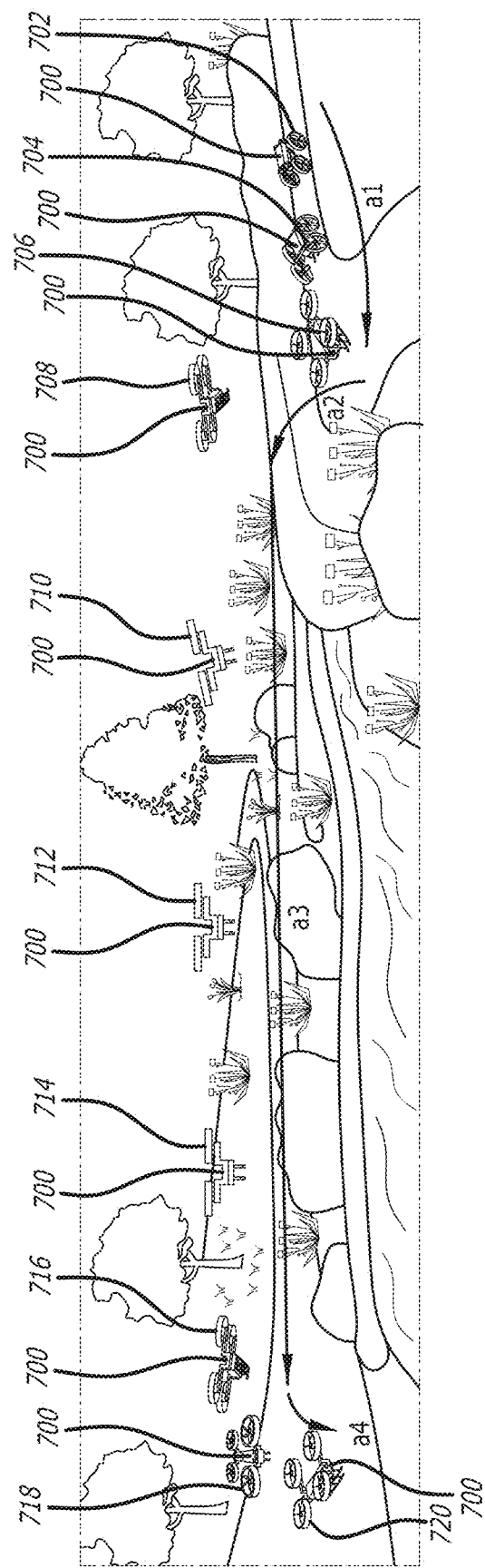
FIG. 7 conceptually illustrates a time-lapse image of an example multi-modal morphing robot crossing a stream.

In several embodiments a multi-modal morphing robot can change its means of locomotion to cross different obstacles. An example time-lapse image of a multi-modal morphing robot crossing a stream is depicted in FIG. 7. The robot 700 moves initial in a UGV configuration from a first location 702, through a second location 704 and to a third location 706. In the third location 706 the robot 700 changes its configuration from UGV to UAV. In an UAV configuration the robot 700 moves to a fourth location 708, and fifth location 710, and sixth location 712, a seventh location 714, and an eight location 716. The robot 700 begins its descent through a ninth location 718, and lands in a tenth location 720. In some embodiments a multi-modal morphing robot can be operated as a manual RC vehicle. In accordance with several embodiment of the invention, a multi-modal morphing robot can be operated autonomously.

In several embodiments an RC transmitter can be used to command a multi-modal robot to drive, transform, and/or fly. An operator, using an RC transmitter, can send commands to the robot to drive, to transform into a UAS mode, and/or to fly. The robot can switch its mode of locomotion depending on the environment. This can lower energy consumption in the UGV mode, or expend more energy by flying over difficult-to-navigate terrains.

In several embodiments a multi-modal morphing robot can be configured to transition from a four-wheeled ground vehicle configuration to a mobile inverted pendulum vehicle configuration. A multi-modal morphing robot transitioning from a four-wheeled ground vehicle configuration to a mobile inverted pendulum vehicle configuration and back is conceptually illustrated in FIG. 8A through FIG. 8J. FIGS. 8A-8B depict a multi-mobile morphing robot performing transformation into mobile inverted pendulum vehicle configuration. FIGS. 8B-8D depict a self-uprighting maneuver. FIGS. 8E-8F depict mobile inverted pendulum balancing. FIGS. 8G-8I depict a landing maneuver. FIGS. 8I-8J depict transformation of the multi-modal morphing robot back into a four-wheeled ground vehicle configuration.

In FIG. 8A a multi-modal morphing robot 800 is in a four-wheeled ground vehicle configuration.

FIG. 8B depicts the multi-modal robot 800 configured such that a first set of wheels 802 and a second set of wheels 804 are rotated to allow landing gear 806 to come into contact with a ground surface. The first set of wheels 802 is positioned for wheel contact with the ground surface. The second set of wheels 804 is positioned for generating generally vertical propeller thrust 808 using propellers 810 (obscured by the wheel 804).

FIG. 8C-8D depicts the multi-modal robot 800 performing a self-uprighting maneuver. The propellers 810 provide a thrust 812, 814 to tend to rotate the robot 800 towards an upright position. The wheels 802 simultaneously rotate clockwise.

FIG. 8E-8F depict the multi-modal robot 800 performing balancing. In FIG. 8E the robot 800 rotates the wheels 802. In FIG. 8F the robot 800 is balanced.

FIG. 8G depicts the multi-modal morphing robot 800 performing an initial step of a landing maneuver. The wheels 802 rotate counter clockwise initiating a tipping of the robot 800.

FIG. 8H depicts the multi-modal morphing robot 800 performing a further step of a landing maneuver. The propeller 810 provides a thrust 816. The thrust 816 slows the descent of the robot 800.

FIG. 8I depicts the multi-modal morphing robot 800 fully landed in the mobile inverted pendulum vehicle configuration.

FIG. 8J depicts the multi-modal morphing robot 800 after the robot 800 rotates the first set of wheels 802 and the second set of wheels 804 into a four-wheeled ground vehicle configuration.

In several embodiments the mobile inverted pendulum configuration can be dynamic two-point contact point locomotion mode. A self-uprighting pitch rate of 10°/s at the beginning to 5°/s near the vertical position can be utilized in several embodiment during a self-uprighting maneuver. In several embodiments a dynamic balancing controller can be initialized at a pitch angle of 7.5° from vertical with a near-zero initial condition. A landing sequence can performed by tipping the robot in one direction using the wheels and activating the thrusters to maintain a constant pitch rate of −10°/s in accordance with embodiments of the invention. Once the robot lands, the robot can transform back into UGV mode. In accordance with some embodiments of the invention, the highest point of the robot's body can stand around 60 cm tall in the mobile inverted pendulum configuration, which is a significant height increase compared to its initial height, which can be 35 cm in the UGV mode. This additional height can be beneficial for scouting the robot's surroundings. In various embodiments, a camera (or other line of sight sensor) can be attached to an upper body portion of a multi-modal morphing robot.

While specific processes and/or systems in connection with a multi-modal morphing robot transitioning from a four-wheeled ground vehicle configuration to a mobile inverted pendulum vehicle configuration and back are discussed above, any of a variety of processes and/or systems can be utilized for an a multi-modal morphing robot transitioning from a four-wheeled ground vehicle configuration to a mobile inverted pendulum vehicle configuration and back as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal morphing robot transitioning from a four-wheeled ground vehicle configuration to a mobile inverted pendulum vehicle configuration and back, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 9:
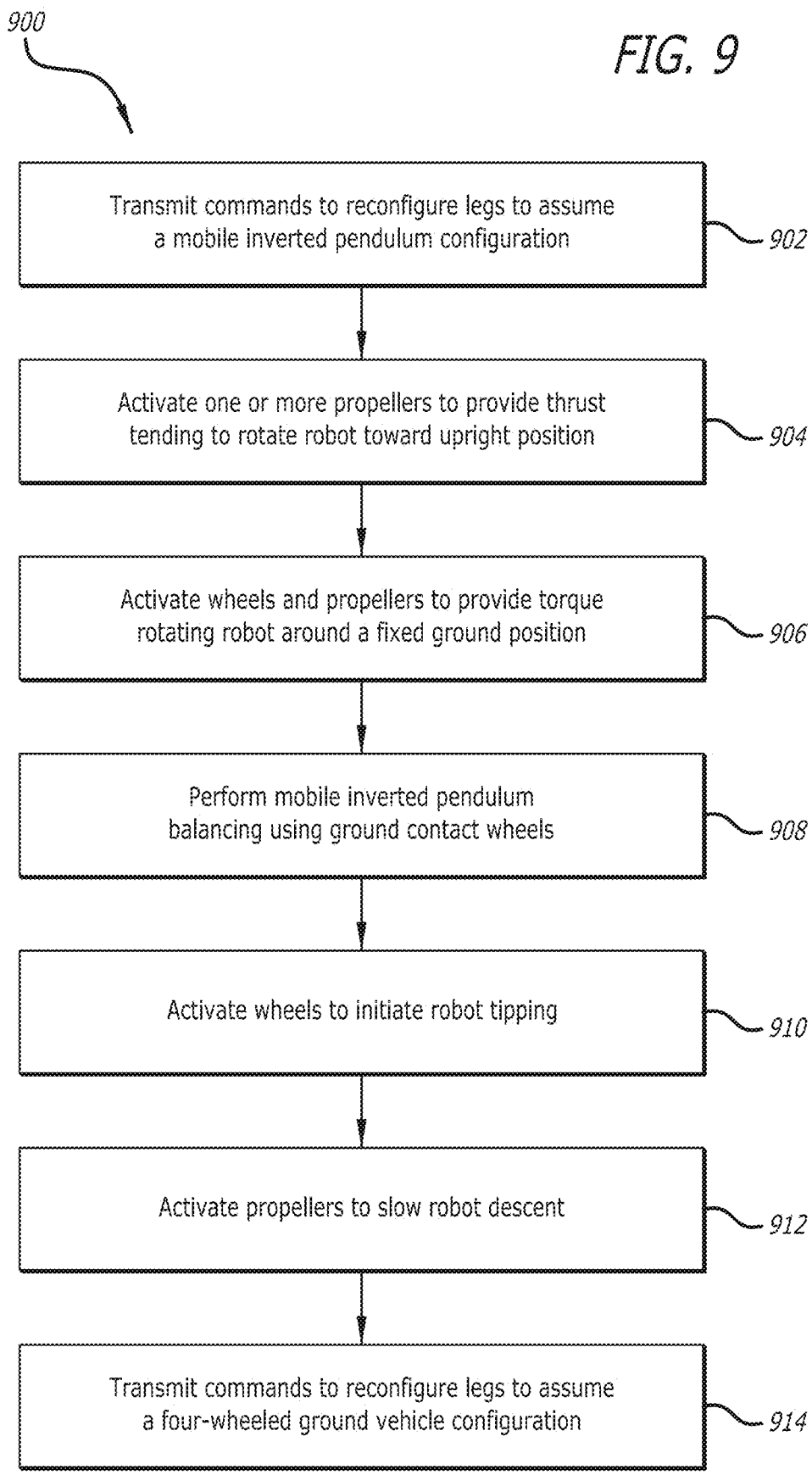
FIG. 9 conceptually illustrates an example process for transitioning a multi-modal robot from a four-wheeled ground vehicle to a mobile inverted pendulum.

In several embodiment a process for transitioning a multi-modal robot from a four-wheeled ground vehicle to a mobile inverted pendulum is performed. An example process for transitioning a multi-modal robot from a four-wheeled ground vehicle to a mobile inverted pendulum is conceptually illustrated in FIG. 9. In several embodiments, the process for transitioning a multi-modal robot from a four-wheeled ground vehicle to a mobile inverted pendulum can be executed by a processor. The process 900 can include transmitting (902) commands to reconfigure legs to assume a mobile inverted pendulum configuration. The process 900 can activate (904) one or more propellers to provide thrust tending to rotate robot toward upright position. The process 900 can activate (906) wheels and propellers to provide torque rotating robot around a fixed ground position. The process 900 can perform (908) mobile inverted pendulum balancing using ground contact wheels. The process 900 can activate (910) wheels to initiate robot tipping. The process 900 can activate (912) propellers to slow the descent of the robot. The process 900 can transmit (914) commands to reconfigure the legs of the robot to assume a four-wheeled ground vehicle configuration.

While specific processes and/or systems in connection with a process for transitioning a multi-modal robot from a four-wheeled ground vehicle to a mobile inverted pendulum are discussed above, any of a variety of processes and/or systems can be utilized for a process for transitioning a multi-modal robot from a four-wheeled ground vehicle to a mobile inverted pendulum as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a process for transitioning a multi-modal robot from a four-wheeled ground vehicle to a mobile inverted pendulum, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 10B:
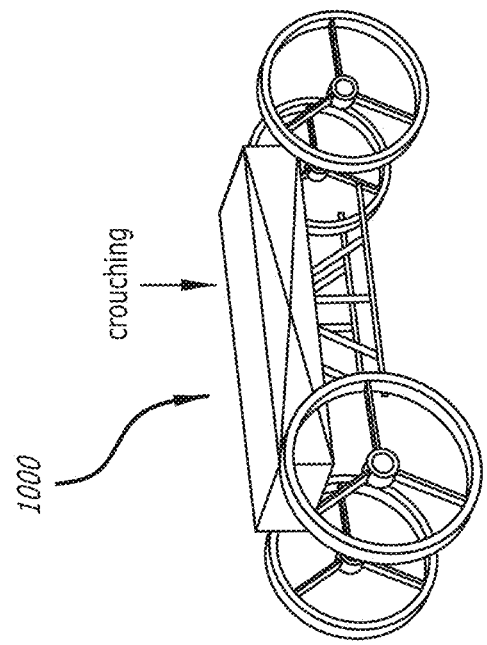
FIGS. 10A-B conceptually illustrate an example multi-modal morphing robot transitioning to a crouched configuration.
Figure 10A:
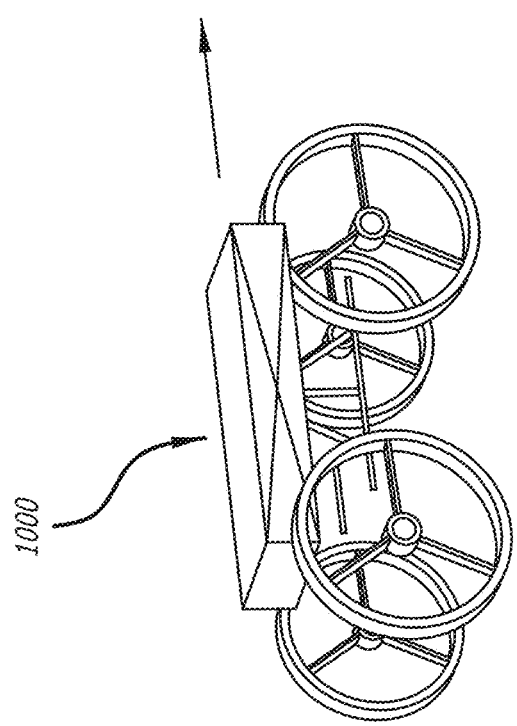

In various embodiments, a multi-modal robot can navigate tight spaces by morphing its configuration. In accordance with embodiments of the invention, a multi-modal morphing robot can crouch to lower its posture and pass under a low clearance opening. An example multi-modal morphing robot transitioning to a crouched configuration is depicted in FIG. 10A-B. A multi-modal morphing robot 1000 is depicted in FIG. 10A in a UGV configuration. The robot 1000 is shown in a crouched UGV configuration in FIG. 10B. The robot 1000 can transition to a crouched position by rotating its sagittal joints outwards which reduces the robot's height, enabling it to drive under a low clearance ceiling.

While specific processes and/or systems in connection with a multi-modal morphing robot transitioning to a crouched configuration are discussed above, any of a variety of processes and/or systems can be utilized for a multi-modal morphing robot transitioning to a crouched configuration as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal morphing robot transitioning to a crouched configuration, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 11A:
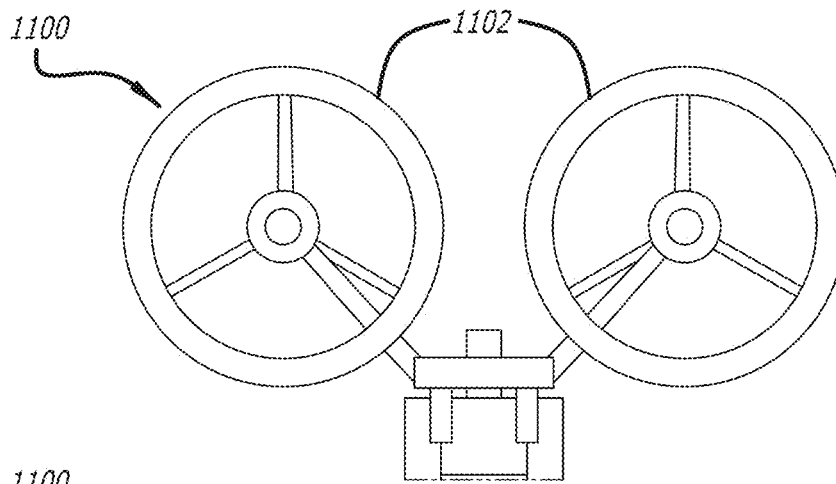
FIGS. 11A-C conceptually illustrate an example multi-modal robot performing loco-manipulation.
Figure 11B:
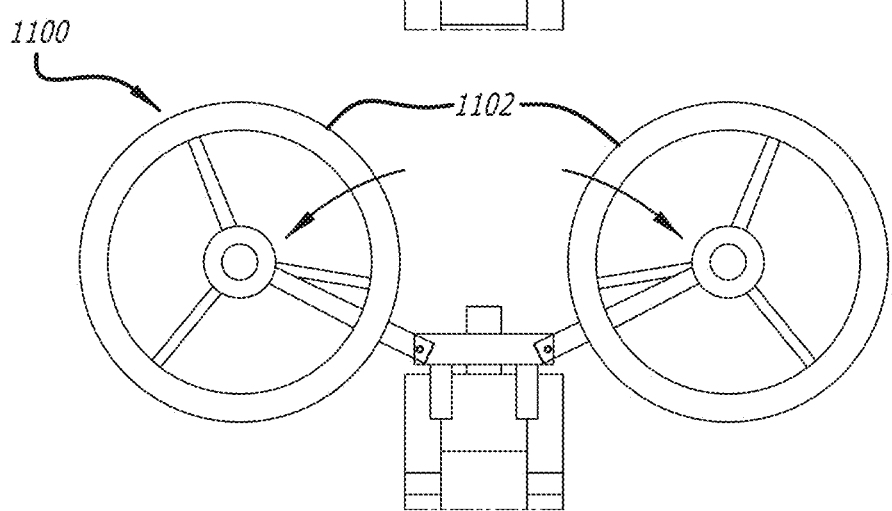
Figure 11C:
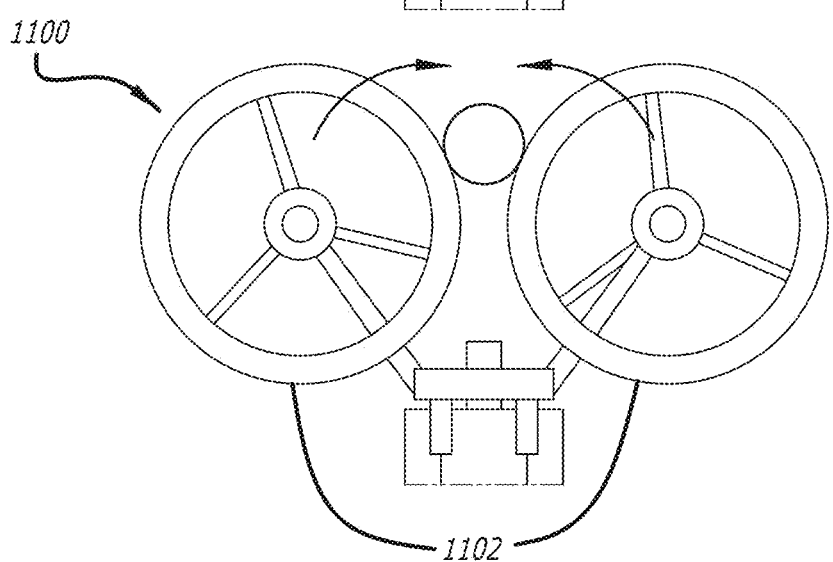

In several embodiment a multi-modal morphing robot can use a loco-manipulation ability to grasp an object by opening and closing its upper legs. Loco-manipulation, is accordance with embodiments of the invention can be performed by a robot's upper legs and/or wheels when the robot is in a mobile inverted pendulum configuration. An example multi-modal robot performing loco-manipulation is conceptually illustrated in FIGS. 11A-C. A robot 1100 is shown in FIG. 11A with its legs 1102 in a neutral position. The robot 1100 is shown in FIG. 11B with its legs 1102 in an opened position for receiving an object. The robot 1100 is shown in FIG. 11C with its legs 1102 in a closed position grasping an object 1104.

While specific processes and/or systems in connection with multi-modal robot performing loco-manipulation are discussed above, any of a variety of processes and/or systems can be utilized for a multi-modal robot performing loco-manipulation as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal robot performing loco-manipulation, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

In various embodiments, a multi-modal morphing robot can perform a crawling gait for locomotion on uneven surfaces. An example multi-modal morphing robot performing a crawling gait on a rocky surface is depicted in FIGS. 12A-E. The multi-modal morphing robot 1200 is depicted using its frontal and sagittal hip joints to control positions of wheels 1202, 1204, 1206, and 1206 independently. In various embodiments, the robot can walk using a simple crawling gait (e.g., quadrupedal locomotion). The absence of knee joints, in several embodiments, can limit possible foot trajectories.

In several embodiments, bounding flight can be used by a multi-modal morphing robot. In some embodiments, legs can retract toward and/or inside the robot body (e.g., chassis) to minimize power loss and enhance flight endurance.

While specific processes and/or systems in connection with multi-modal morphing robot performing a crawling gait on a rocky surface are discussed above, any of a variety of processes and/or systems can be utilized for a multi-modal morphing robot performing a crawling gait on a rocky surface as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal morphing robot performing a crawling gait on a rocky surface, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

System Dynamics

Figure 6:
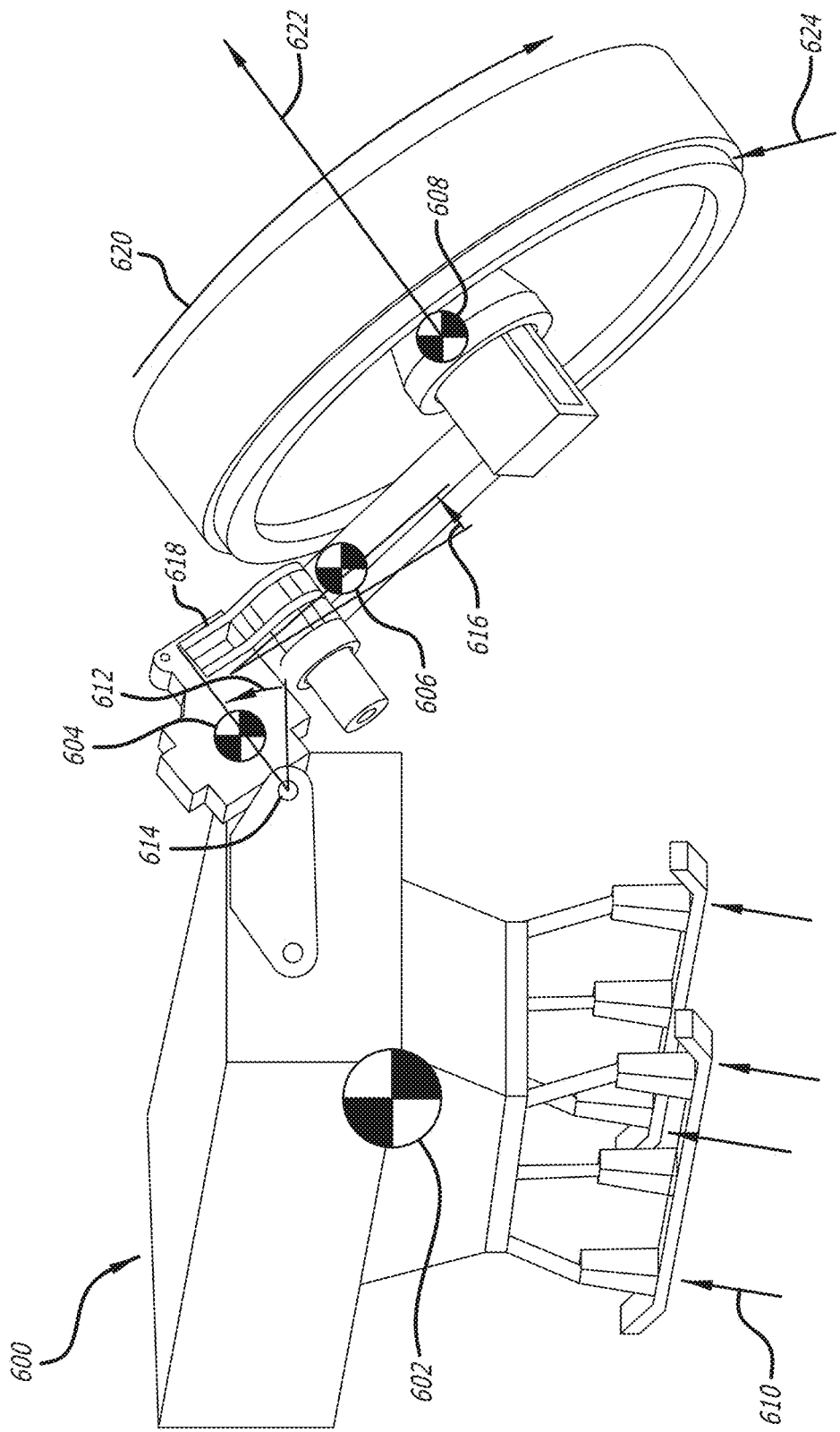
FIG. 6 conceptually illustrates an example free-body diagram for dynamic modeling of an example multi-modal morphing robot.

In various embodiments, control, analysis and simulation of a multi-modal morphing robot can be based on a dynamic model of the robot for control, analysis, and simulation. 3D simulation tools can be used for this. In several embodiments, the model can be derived symbolically to extract the inertia, Coriolis, and gravitational terms for flexibility for model-based nonlinear control design by presenting model components that can be programmed in the robot's computer. In several embodiments, the degrees of freedom (DOF) and robot's kinematics seen in FIG. 6 are used throughout the modeling. In accordance with some embodiments of the invention, the robot can be modelled as being composed of 13 rigid bodies (e.g., one main body and three linkages per leg).

Path Planning and Trajectory Following

Figure 13:
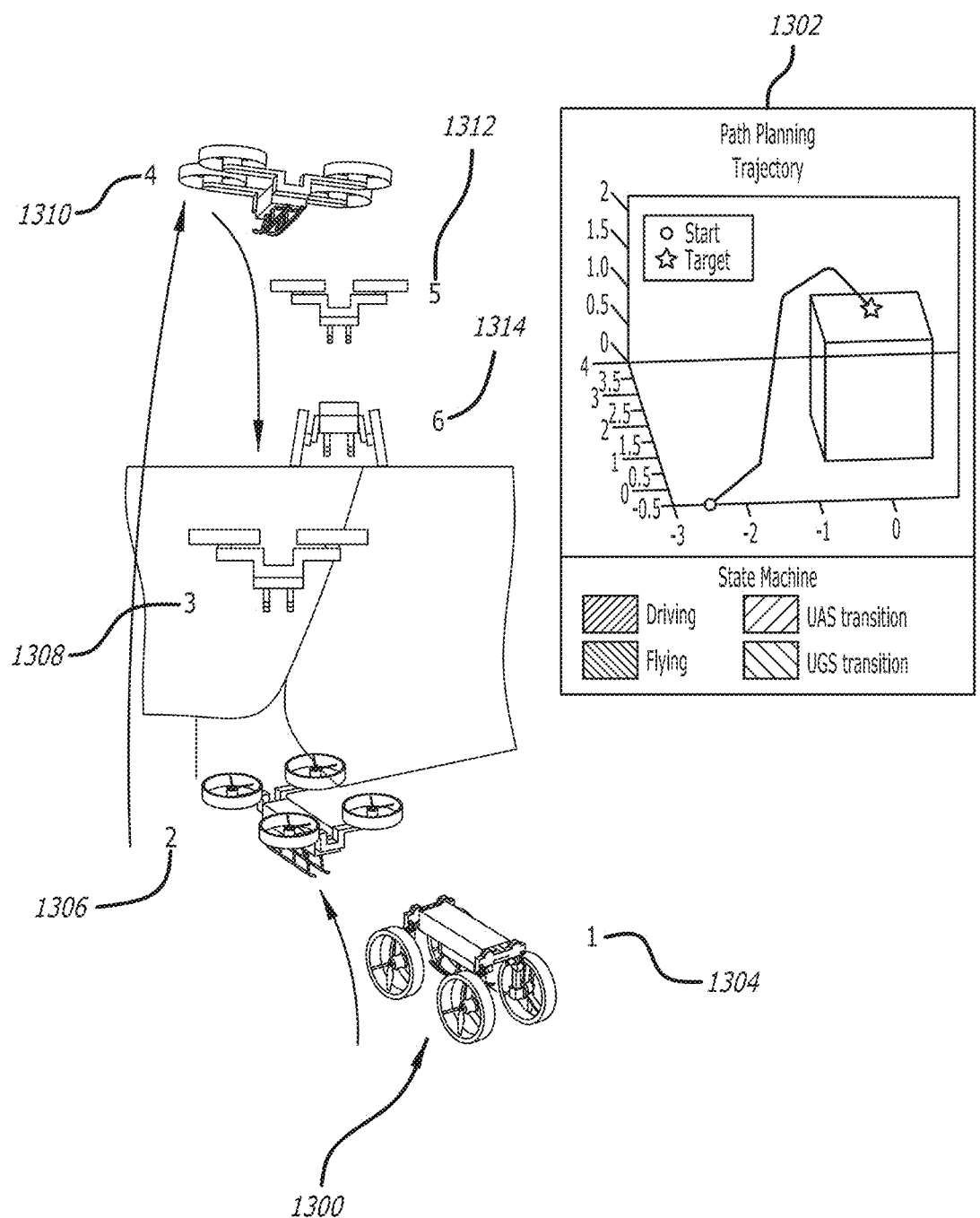
FIG. 13 conceptually illustrates A multi-modal morphing robot following a planned trajectory.

In various embodiments a multi-modal morphing robot can follow a planned trajectory. A multi-modal morphing robot following a planned trajectory is illustrated in FIG. 13. The robot 1300 followed a planned trajectory 1302 to land on top of a platform. During execution of the planned trajectory the robot 1300 moved as a UGV from a first waypoint 1304 to a second waypoint 1306. The robot 1300 transitioned from a UGV to a UAV at a second waypoint 1306. The robot 1300 flew as a UAV from the second waypoint 1306 through a third waypoint 1308, a fourth waypoint 1310, a fifth waypoint 1312, and lands at a sixth waypoint 1314. At the sixth waypoint 1314 the robot transitioned back to a UGV.

Multi-modal morphing robots can perform autonomous tracking of trajectories in various embodiments. Trajectories can be generated by a path planning algorithm. Path planning algorithms, in accordance with embodiments of the invention can be based on multi-modal probabilistic roadmap (MM-PRM) and 3D A* algorithms.

Multi-modal robots can use, in accordance with many embodiments of the invention, path-planning optimization methods that work with multiple modes of locomotion. Several examples path-planning optimization methods for multi-modal robots are conceptually illustrated in FIGS. 14A-F. An example uniform discretization 1402 is conceptually illustrated in FIG. 14A. An example 3D MM-PRM discretization 1404 is conceptually illustrated in FIG. 14B. The 3D MM-PRM discretization 1404 was generated using parameters R=4 meters, Nw=300, and Nf=300. These parameters are defined elsewhere herein. An example edge generation 1406, where the edges are based on the MM-discretization 1404 is conceptually illustrated in FIG. 14C. An example first planned trajectory 1408 for a first environment 1410 is conceptually illustrated in FIG. 14D. An example second planned trajectory 1412 for a second environment 1414 is conceptually illustrated in FIG. 14E. An example third planned trajectory 1416 for a third environment 1418 is conceptually illustrated in FIG. 14F. In FIGS. 14D-F, the red boxes represent obstacles that cannot be driven over, while the green box represents a drive-able platform. In several embodiments multi-modal path planning can be configured to minimize the total energy consumed by the robot and optimize the choice of locomotion mode (e.g., ground or aerial). To achieve this goal, the environment can be discretized into a set of nodes where each node is associated with one of the locomotion modes. The nodes can then be connected by edges and a cost for traveling between the nodes can be computed. The cost can be in terms of energy. Based on the nodes, edges, and/or costs an algorithm (e.g., a A* algorithm) can be used to determine the optimal path defined by a set of waypoints, wherein each waypoint is associated with a locomotion mode.

Various embodiments can use one of two different discretization methods to create a set of nodes and edges representing the environment. A first method can discretize the 3D environment into a set of uniformly distributed points. A second method can discretize a 3D environment into more sparsely distributed points using a 3D MM-PRM shown in Algorithm 1 (An example 3D MM-PRM algorithm is conceptually illustrated in FIG. 15). This adapted version of the Probabilistic Road Map (PRM) algorithm accounts for the Multi-Modal nature of the robot's movements. The MM-RPM method can generate a significantly reduced amount of nodes (e.g., as compared with a uniform discretization) which greatly reduces the computational time and cost of performing a path-finding algorithm.

In a classical PRM (e.g., non-multi-modal) algorithm, a graph can be built in the defined space by generating a certain number of nodes, where the nodes are created with random positions one by one. When a node is created, a process can search for the nearest nodes already present in the graph and then connect to them to form edges while checking that the new edges do not cross any obstacles. The classical PRM method can be adapted to generate a graph for unimodal robots by constraining the node generation to a single mode (e.g., create only ground nodes for the UGV mode or create only aerial nodes for the UAV mode).

In several embodiments a multi-modal PRM can be used in path planning. In a multi-modal PRM two (or more) sets of constraints can be used when generating the nodes. A difference with the classical PRM algorithm is that a constraint is added on a certain number of nodes to ensure a sufficient number of nodes are created in each mode of locomotion. This multi-modal version of the PRM algorithm can require the definition of three (or more) parameters. Parameters can include the number of ground surface nodes Nw, the number of nodes describing flyable space Nf, and the maximum distance between neighboring nodes R.

A description of an example algorithm follows:

New ground nodes Xnew are randomly assigned according to the following constraint:

$$Xnew \in \{(x,y,z):z=zGND)\}, \quad (5)$$

where zGND is the ground elevation. Similarly, new nodes in the flyable task space are obtained as follows:

$$Xnew \in \{(x,y,z):z>0,z/=zGND\}. \quad (6)$$

The search for neighboring nodes that will then be used to create the edges (E) is at the core of the PRM algorithm, and they are found using the following condition:

$$Xnearest=\{X \in N: \|Xnew-X\| \le R\}, \quad (7)$$

where N is the set of nodes already created, R denotes the maximum radius distance, and $\|\cdot\|$ is the Euclidean norm.

In several embodiments, cost and time of calculation are very strongly linked to the choice of the values of the algorithm parameters (R, Nw, Nf). The greater the total number of nodes or the greater the radius of acceptance of the neighbors, the greater the computation time and cost will be. Therefore, it is necessary to study the convergence of the result in the function of the parameters to optimize for computation cost. In several embodiments the parameters can be set R=4 meters, Nw=300 and Nf=300. An example 3D MM-PRM algorithm is conceptually illustrated in FIG. 15.

In various embodiments the 3D MM-PRM algorithm produced a graph representative of the environment with a reduced number of nodes as compared with uniform discretization. This reduces the cost and the computing time while avoiding any compromises on the performance concerning the optimality of the path obtained. A comparison was made to show the difference between the two methods of discretization, shown in FIG. 14A and FIG. 14B. The uniform grid generated 9892 nodes and 219340 edges compared to the 3D MM-PRM algorithm, which generated 500 nodes and 30920 edges. This significant reduction in nodes can beneficially reduce the computational time, where the uniform grid took 78 s to compute compared to the 3D MM-PRM algorithm's 12 s.

In several embodiments, calculating a locomotion cost for the path planner includes determining the costs associated with each mode and also the cost corresponding to the transition from one mode to another. The cost of transport on a ground edge denoted by Cw is calculated based on the power consumption by the wheel motor, Pw. In several embodiments, Pw can be integrated over the time of wheeled locomotion. The total power consumption can be computed based on the torque and the angular velocity of each motor which is obtained from the current draw and encoder measurements. In accordance with several embodiments of the invention the time of ground locomotion can be calculated based on the distance d between the two nodes. As a result, Cw can be given by:

$$Cw=\int_0^{td} Pw(T)dT$$

In various embodiments, the energetic cost on a flying edge Cf can be computed using the power consumption Pf in hovering, the robot forward velocity of in flying mode, and the altitude z of the two nodes. Hence, Cf can be given by:

$$Cf = Pf \frac{d}{vf} + mg(z2-z1),$$

where z1 and z2 are respectively the altitudes of nodes 1 and 2, m is the mass of the robot, and g is the gravitational acceleration constant.

The transition cost Ct between two modes, in several embodiments, can be determined based on the power consumption of the joints during the morphing process Pt. Then, Pt is integrated over the time of transition tt which yields:

$$Ct=\int_0^{tt} Pt(T)dT$$

Based on these three energetic costs, a process can determine the optimal path in the edge space generated by a discretization (e.g., 3D MM-PRM) algorithm using a cost (e.g., A*) algorithm.

In various embodiments, based on the cost functions the optimal path on the graph using a search function (e.g., the A* path search algorithm). The search function can find an optimal path by using a heuristic function. The algorithm can compute the best path to each node by only visit the most promising nodes. This approach can avoids going through all possible paths and, therefore, finding the first-best optimal path with a low computational cost.

In several embodiments, each time the algorithm explores an h node, a process can calculates the minimum cost f(n) necessary to reach the goal by passing through it using the following formula:

$$f(n)=g(n)+h(n), \quad (11)$$

where g(n) is the real cost from the start to the n-th node, computed based on (12), and h(n) denotes the heuristic cost to the goal. The heuristic cost h(n) can calculated by summing two conservative costs. First, the cost of driving on flat ground to the goal in a straight line is calculated. Second, the cost of flying vertically along the z-axis to the goal is obtained. Since the cost of driving is much lower than flying, this is the most optimal way to move between two points if there are no obstacles or impassable terrains. The following cost for g(n) is defined:

$$g(b)=\Sigma_{i=0}^{Ew} Cw,i+\Sigma_{j=0}^{Ef} Cf,j+Nt*Ct \quad (12)$$

where Ew and Ef are respectively the number of ground and aerial edges traveled by the robot, Cw,i is the cost on the ground edge i, Cf,j denotes the cost on the flying edge j, and Nt represents the number of mode transitions made by the robot.

In accordance with various embodiments, the multi-modal robot can include a stereo camera (e.g., a stero camera from Intel RealSense, which is very light, efficient, and inexpensive). The stereo camera can be used to create point-cloud representation of the world in real-time. In accordance with embodiments of the invention, the inclusion of this (and/or another) exteroceptive sensor can allow creation of occupancy maps to evaluate traversability of the world for autonomous switching between different modes of locomotion. In several embodiments, the MIP configuration can be used to position exteroceptive sensors for enhancing the quality of a created occupancy map.

While specific processes and/or systems in connection with path-planning optimization methods for multi-modal robots are discussed above, any of a variety of processes and/or systems can be utilized for path-planning optimization methods for multi-modal robots as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to path-planning optimization methods for multi-modal robots, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 16:
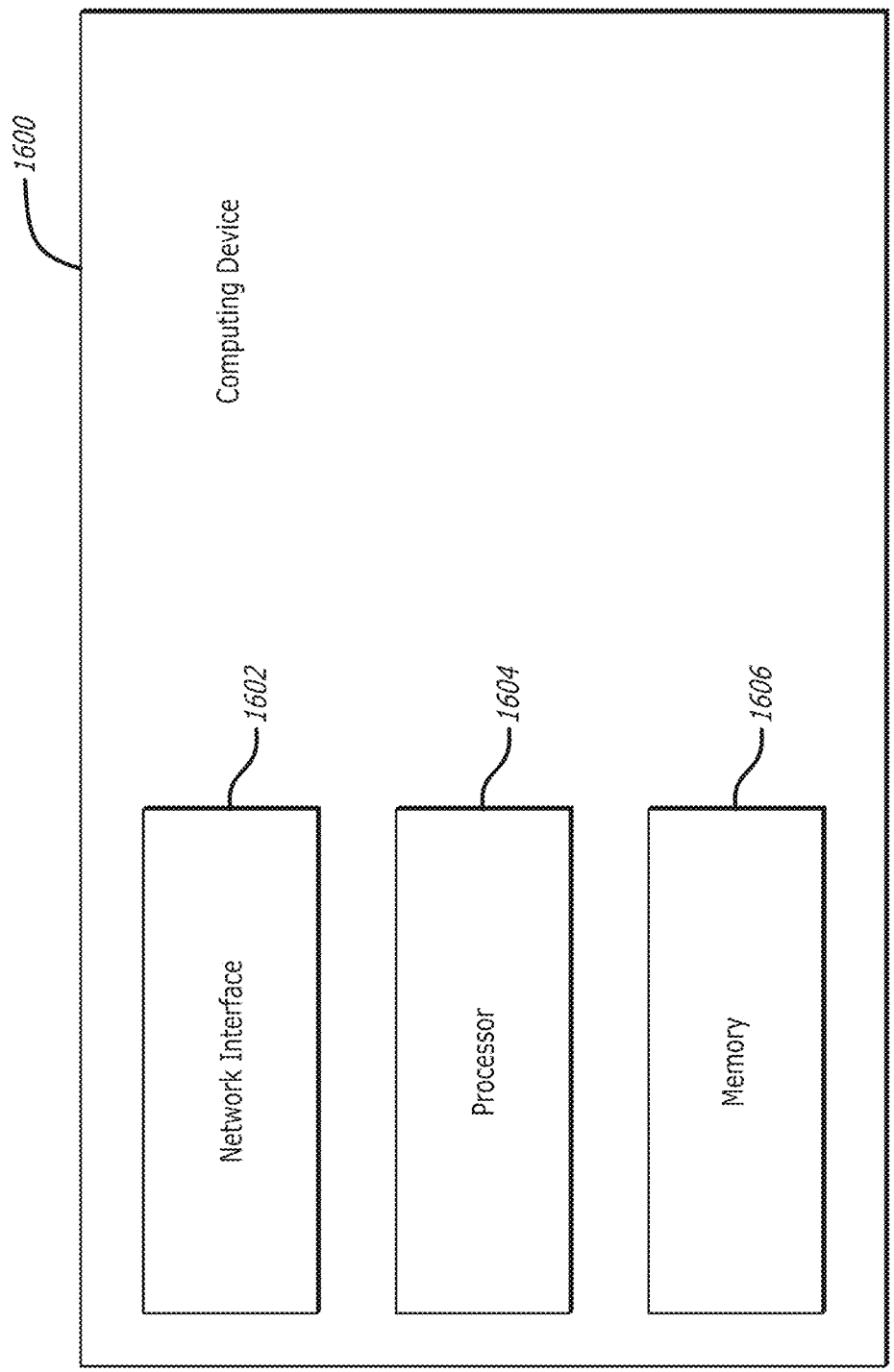
FIG. 16 conceptually illustrates an example computing device.

In accordance with various embodiments of the invention, a computing device can receive information from a UWB radar. An example computing device is conceptually illustrated in FIG. 16. A computing device 1600 can include a network interface 1602, a processor 1604, and a memory 1606. The memory 1606 can contain instructions to cause the processor 1604 to execute processes and instructions as described elsewhere herein.

While specific processes and/or systems in connection with a computing device are discussed above, any of a variety of processes and/or systems can be utilized for a computing device as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a computing device, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 17:
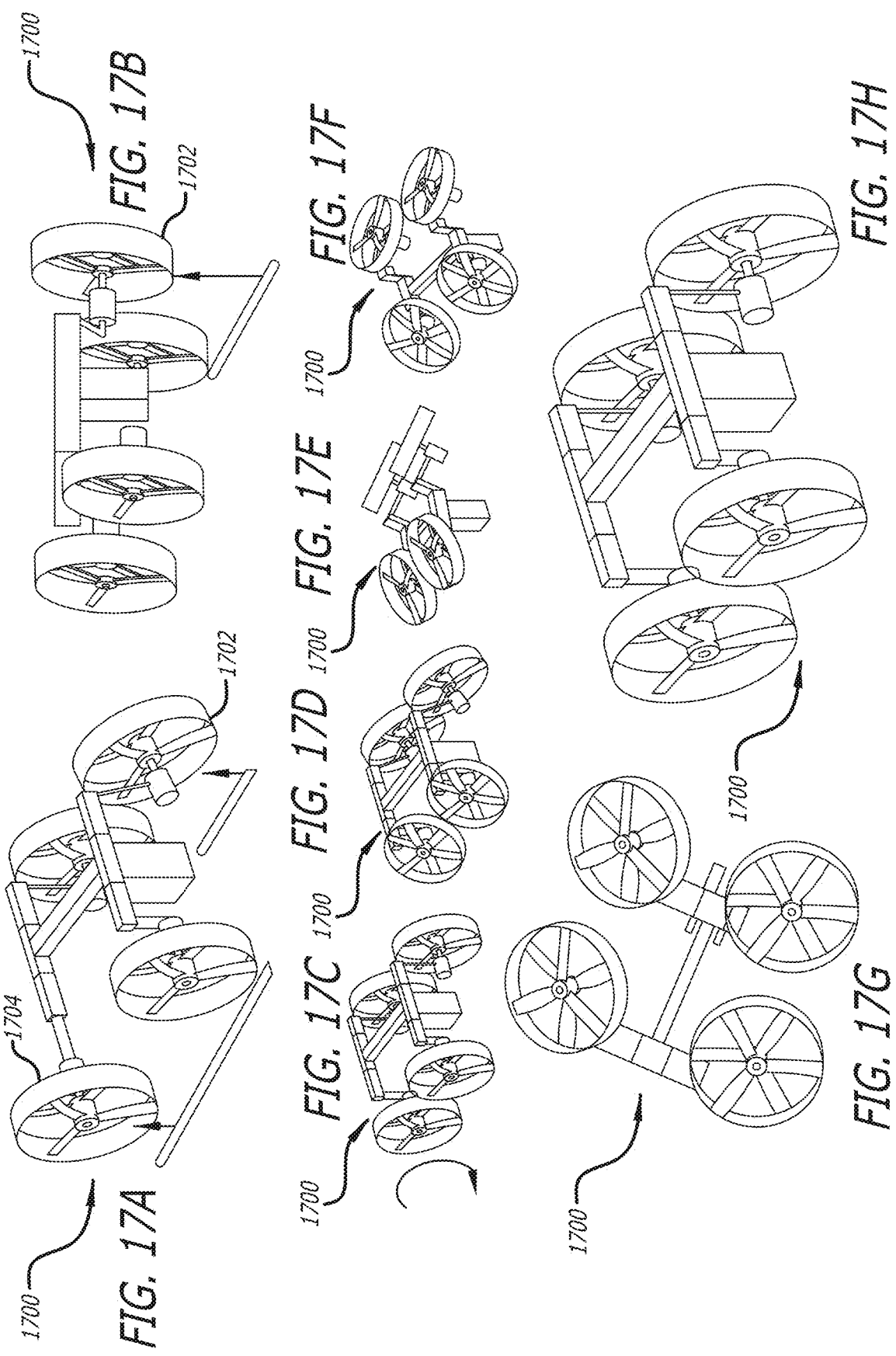
FIGS. 17A-H conceptually illustrate an example multi-modal morphing robot with integrated wheels and rotors.

In accordance with various embodiments of the invention a multi-modal morphing robot can include integrated wheels and rotors. An example multi-modal morphing robot with integrated wheels and rotors is conceptually illustrated in FIGS. 17A to 17H. FIG. 17A depicts a multi-modal morphing robot 1700 with wheel 1702 and wheel 1704 raised above a grounded position. FIG. 17B depicts the multi-modal morphing robot 1700 with wheel 1702 raised high above a grounded position.

FIGS. 17C to 17F depicts the multi-modal robot 1700 transitioning from a UGV configuration to a UAV configuration.

FIG. 17G depicts the multi-modal robot 1700 in a UAV configuration.

FIG. 17H depicts the multi-modal robot 1700 in a UGV configuration.

In various embodiments, a multi-modal morphing robot can be a four-legged walking-wheeling-flying rover. Multi-modal morphing robots can include an articulated body structure and rotor wheels. In some embodiments, a multi-modal robot can include four (or another number) articulated three-degrees-of-freedom legs. The design can include twelve degrees of freedom fully autonomously actuated with onboard electronics, including a computer, LIDAR, stereo-vision system, and power electronics. The articulated body can permit navigation over rough terrain and morphing from ground to aerial mobility. Multi-purpose wheels can facilitate locomotion transitions from land to air. Multi-purpose propeller structures can be attached to each leg-end, and located in and/or integrated with the wheels. The implementation of a multi-modal morphing robot can address prohibitive design restrictions, such as payload and powerful actuators, that exist in designing aerial and ground vehicles by using a smart structure design wherein all components (e.g., electronics, and mechanical components) are embedded inside thermoplastic composite (e.g., carbon-fiber Onyx) materials through a fiber-inlay fabrication process.

While specific processes and/or systems in connection with a multi-modal morphing robot with integrated wheels and rotors are discussed above, any of a variety of processes and/or systems can be utilized for a multi-modal morphing robot with integrated wheels and rotors as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a multi-modal morphing robot with integrated wheels and rotors, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

Figure 18:
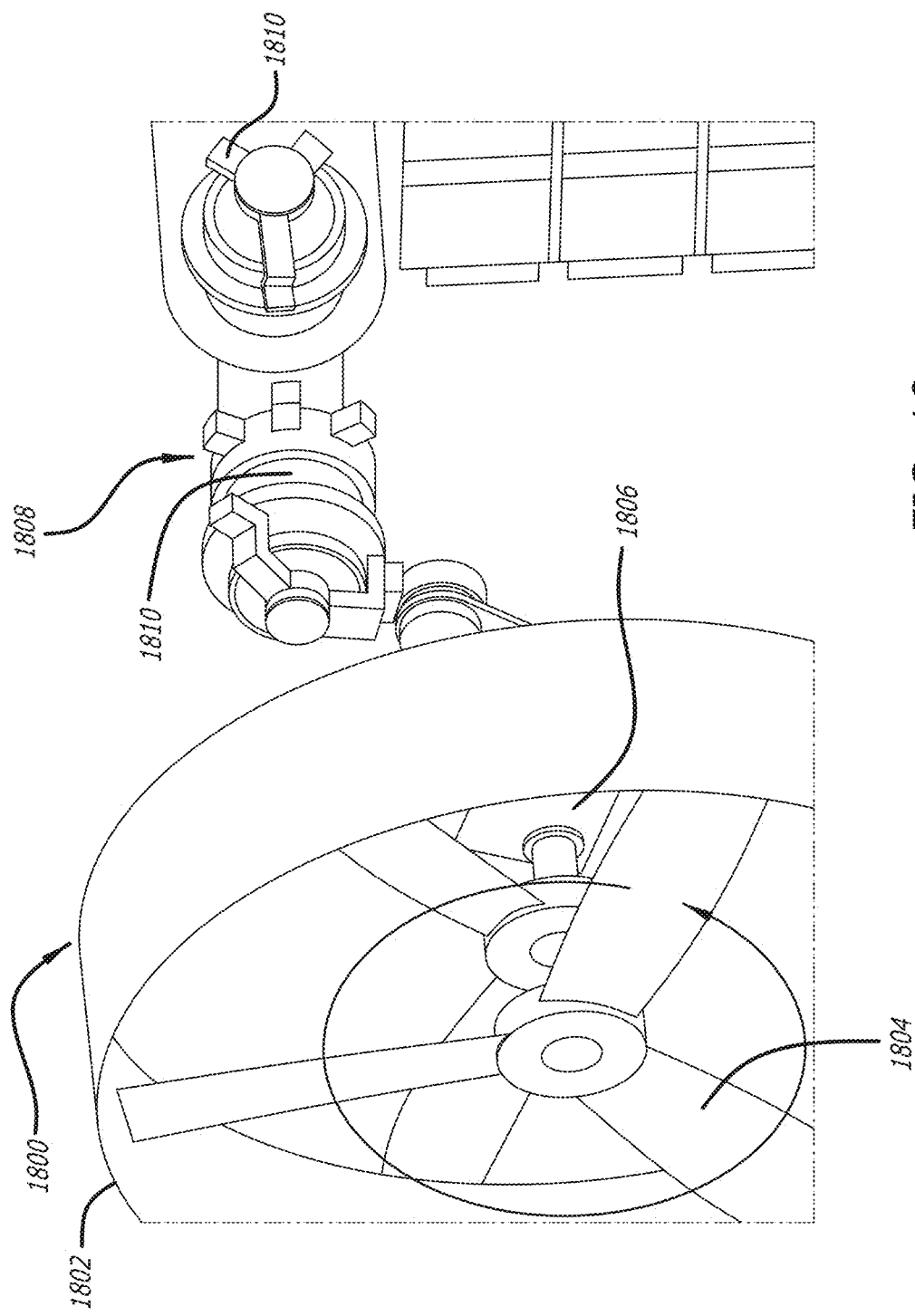
FIG. 18 conceptually illustrates an example wheel and propeller element actuated by a single actuator.

In accordance with several embodiments of the invention a multi-modal morphing robot can include a single actuator for actuating the wheel and propeller element. An example wheel and propeller element actuated by a single actuator is conceptually illustrated in FIG. 18. A multi-modal morphing robot 1800 can include a wheel 1802 that is integrated with a propeller 1804. The integrated wheel 1802 and propeller 1804 can be driven by a wheel/propeller actuator 1806. The wheel/propeller actuator 1806 can be mounted on a terminal end of a leg 1808. The leg 1808 can include a leg actuator 1810 and a hip actuator 1812. In various embodiments, the actuators can include position feedback mechanisms and/or transmissions.

While specific processes and/or systems in connection with a wheel and propeller element actuated by a single actuator are discussed above, any of a variety of processes and/or systems can be utilized for a wheel and propeller element actuated by a single actuator as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a wheel and propeller element actuated by a single actuator, the techniques disclosed herein may be used in any type of ground vehicle and/or air vehicle system. The techniques disclosed herein may be used within any of the multi-modal morphing robots, UAVs, UGVs, MIPS, control systems and/or processes, trajectory planning systems and/or processes and other systems and/or processes as described herein.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A multi-modal robot capable of aerial mobility and ground mobility, the multi-modal robot comprising:
  a chassis;
  a leg attached to the chassis, the leg comprising:
    a frontal hip joint, wherein:
      the frontal hip joint is capable of rotating around a frontal hip axis of rotation, and
      the frontal hip axis of rotation is parallel to a longitudinal axis of the chassis;
    a first link having a first proximal end and a first distal end, where the first link is coupled at the first proximal end to the frontal hip joint;
    a sagittal hip joint, wherein:
      the sagittal hip joint is coupled to the first distal end of the first link,
      the sagittal hip joint is capable of rotating around a sagittal hip axis of rotation, and
      the sagittal hip axis of rotation is parallel to a first link longitudinal axis;
    a second link, where the second link is coupled at a second proximal end to the sagittal hip joint;
    a wheel, wherein:
      the wheel is coupled to the second link at a first location, and
      the wheel configured to rotate around a wheel axis of rotation; and
    a propeller, wherein:
      the propeller is co-axial with the wheel, and
      the propeller configured to rotate around the wheel axis of rotation.

2. The multi-modal robot of claim 1, wherein the chassis comprises a frontal hip actuator, the frontal hip actuator connected to the frontal hip joint and configured to drive the frontal hip joint.

3. The multi-modal robot of claim 1, wherein the multi-modal robot further comprises a second leg, a third leg, and a fourth leg.

4. The multi-modal robot of claim 1, wherein the leg is movably attached to a frontal surface of the chassis.

5. The multi-modal robot of claim 1, wherein the first link comprises a sagittal hip actuator.

6. The multi-modal robot of claim 1, wherein the first link is perpendicular to the frontal hip axis of rotation.

7. The multi-modal robot of claim 1, wherein the wheel and the propeller are driven by different actuators.

8. The multi-modal robot of claim 1, wherein the first location is a second distal end on the second link.

9. The multi-modal robot of claim 1, wherein the wheel includes a wheel gear.

10. The multi-modal robot of claim 1, wherein the wheel is driven by wheel actuator, the wheel actuator located along a length of the second link between the second proximal end and the first location.

11. The multi-modal robot of claim 1, wherein the wheel is driven by a wheel actuator, and the wheel actuator is offset radially from the wheel axis.

12. The multi-modal robot of claim 1, wherein the propeller is a direct-drive propeller.

13. The multi-modal robot of claim 1, wherein the propeller is driven by a propeller actuator, and the propeller actuator is coaxial with the wheel.

14. A multi-modal robot capable of transitioning from a prone position to a vertical inverted pendulum configuration, the multi-modal robot comprising:
  a chassis with a longitudinal axis;
  one or more propellers mounted to the chassis, wherein the one or more propellers are capable of being driven by one or more propeller actuators and the one or more propeller actuators are capable of being controlled by one or more propeller actuator controllers;
  a set of wheels mounted to a first end of the chassis, wherein the set of wheels is capable of being driven by one or more wheel actuators and the one or more wheel actuators are capable of being controlled by one or more wheel actuator controllers;
  a memory;
  a processor;
  wherein the processor is configured to execute instructions to command the multi-modal robot to transition from a first position in which the chassis longitudinal axis is generally parallel to ground to a second position in which the chassis longitudinal axis is generally perpendicular to ground by:
    generating first propeller actuator controller instructions capable of causing the one or more propellers to generate thrust such that the chassis tracks a first pitch rate until a first cutoff pitch, and causing the chassis to rotate from the first position to the second position;
    generating first wheel actuator controller instructions capable of causing the set of wheels to provide torque, and causing the chassis to rotate from the first position to the second position;
    generating second propeller actuator controller instructions capable of causing the one or more propellers to generate thrust such that the chassis tracks a second pitch rate until a second cutoff pitch, and causing the chassis to rotate from the first position to the second position; and
    generating second wheel actuator controller instructions capable of causing the set of wheels to rotate, and maintaining the second position of the chassis; and
  the multi-modal robot is configured so that when in the vertical inverted pendulum configuration the multi-modal robot can perform ground movements with two contact points.

15. The multi-modal robot of claim 14, wherein the one or more propellers are mounted to the chassis, and the one or more propellers can be positioned relative to the chassis.

16. The multi-modal robot of claim 14, wherein the first wheel actuator controller instructions are capable of causing set of wheels to provide torque to move the first end of the chassis generally underneath the one or more propellers.

17. The multi-modal robot of claim 14, wherein the first propeller actuator controller instructions are first thrust-vectoring instructions, and the second propeller actuator controller instructions are second thrust-vectoring instructions.

* * * * *